US008087002B2

(12) United States Patent
Fjeldstad et al.

(10) Patent No.: US 8,087,002 B2
(45) Date of Patent: Dec. 27, 2011

(54) METHOD AND SYSTEM FOR PROVIDING A VISUAL DEBUGGER FOR AN INTERPRETED STATISTICAL LANGUAGE

(75) Inventors: Brian Fjeldstad, Seattle, WA (US); Michael J Sannella, Seattle, WA (US); Charles B Roosen, Seattle, WA (US)

(73) Assignee: Tibco Software Inc., Palo Alto, CA (US)

( * ) Notice: Subject to any disclaimer, the term of this patent is extended or adjusted under 35 U.S.C. 154(b) by 1209 days.

(21) Appl. No.: 11/784,209

(22) Filed: Apr. 4, 2007

(65) Prior Publication Data
US 2007/0250819 A1 Oct. 25, 2007

Related U.S. Application Data

(60) Provisional application No. 60/789,623, filed on Apr. 4, 2006.

(51) Int. Cl.
*G06F 9/44* (2006.01)
(52) U.S. Cl. .................................................. 717/124
(58) Field of Classification Search .................. 717/124, 717/125, 129
See application file for complete search history.

(56) References Cited

U.S. PATENT DOCUMENTS

| | | | | |
|---|---|---|---|---|
| 5,740,413 A | * | 4/1998 | Alpert et al. | 712/227 |
| 5,881,288 A | * | 3/1999 | Sumi et al. | 717/125 |
| 6,195,616 B1 | * | 2/2001 | Reed et al. | 702/119 |
| 6,205,560 B1 | * | 3/2001 | Hervin et al. | 714/34 |
| 6,477,664 B1 | * | 11/2002 | Hong | 714/35 |
| 7,203,926 B2 | * | 4/2007 | Bogle et al. | 717/124 |
| 7,331,002 B2 | * | 2/2008 | Rivard et al. | 714/35 |
| 2002/0184477 A1 | * | 12/2002 | Swaine et al. | 712/227 |
| 2003/0106045 A1 | * | 6/2003 | Arnold et al. | 717/129 |
| 2003/0106046 A1 | | 6/2003 | Arnold et al. | |
| 2005/0034024 A1 | * | 2/2005 | Alverson et al. | 714/38 |
| 2006/0064677 A1 | | 3/2006 | Bickson et al. | |
| 2008/0263528 A1 | * | 10/2008 | Moore et al. | 717/139 |

FOREIGN PATENT DOCUMENTS

CA 2307546 A1 4/2001

OTHER PUBLICATIONS

Bravington, "Debugging Without (Too Many) Tears," R News, vol. 3, No. 3, Dec. 2003, 5 pages.
Commands from S-Plus 7.0 Language Reference, Insightful Corporation, Apr. 2005, 21 pages.

(Continued)

*Primary Examiner* — Anna Deng
(74) *Attorney, Agent, or Firm* — Lowe Graham Jones PLLC

(57) ABSTRACT

Methods and systems for visual debugging of an interpreted language in, for example, an Interactive Development Environment are provide. Example embodiments provide an S-PLUS Visual Debugging System ("SPVDS"), which includes an S-PLUS Workbench Debugger ("SPWD") that provides "step-based" visual debugging, enabling programmers to step through execution of expressions by setting and otherwise managing breakpoints, examining variables and expressions, and controlling execution such as by step, step-in, step-out, step-over, continue, stop commands. In addition, the SPWD provides a profiler which tracks the number and duration of calls to functions and the amount of memory allocated to variables. This abstract is provided to comply with rules requiring an abstract, and it is submitted with the intention that it will not be used to interpret or limit the scope or meaning of the claims.

40 Claims, 42 Drawing Sheets

OTHER PUBLICATIONS

Ford, "Using the Ruby Development Tools plug-in for Eclipse," ThoughtWorks, Oct. 11, 2005, 17 pages.
Ha, "[Rd] R interpreter in Java/R plugin or RCP for Eclipse," electronic mail message, Oct. 24, 1998, 2 pages.
"Lepido, an IDE for Apache Cocoon," archived Lepido Project Proposal, Eclipse.org, Apr. 2005, 6 pages.
"Lepido, Tools for Apache Cocoon," The Eclipse Foundation, Eclipse.org, 2006, 7 pages.
Leszek, "Debugging with the Eclipse Platform," May 6, 2003, 11 pages.
"[R] Eclipse plugin for R or perhaps S-plus," R Help archive, Message thread from Jul. 17-20, 2004, 9 pages.
"Re: [S] Must have S-Plus 4 add ons?" S News, Message thread from Mar. 6-9, 1998, 4 pages.
S-Plus 7 Enterprise Developer Product Data Sheet, Insightful Corporation, Apr. 2005, 4 pages.
Thomas et al., "MT 3607: Computing in Statistics," Lecture 6: Testing and debugging, Mar. 1, 2006, 5 pages.
Wright et al., "How to write an Eclipse debugger," Eclipse Corner Article, © IBM and Bjorn Freeman-Benson, Aug. 27, 2004, 28 pages.
Sergio Antoy and Stephen Johnson; TeaBag: A Functional Logic Language Debugger; Proceedings of the 13th International Workshop on Functional and (Constraint) Logic Program (WFLP04); Aachen, Germany, Technical Report Department of Computer Science of RWTH Aachen, No. AIB-2004-05; Jun. 1, 2004; pp. 4-18.
Damien Ciabrini and Manual Serrano; "Bugloo: A Source Level Debugger for Scheme Programs Compiled Into JVM Bytecode"; Proceedings of the Third International Lisp Conference, 2003; pp. 1-12.
Serrano M; "Bee: An Integrated Development Environment for the Scheme Programming Language"; Journal of Functional Programming, Cambridge University Press, Cambridge, GB, vol. 10, No. 4, Jul. 1, 2000; pp. 353-395.
Daniel J. Pless and George F. Luger; "GUI Environments for Functional Languages"; Research Report No. TR-CS-2003-15; University of New Mexico, Albuquerque, 2003; pp. 1-5.

* cited by examiner

S-Engine Debug "State" Structure

Eval Hooks for Breakpoints

```
Eval ( ) {
"standard stuff"
...
If (s_do_debugging_work)           ~2101
    s_do_debug_pause?(...)         ~2102
If (s_do_profiling_work)           ~2103        2104
    s_do_profiling_work_for_functions(...);
...
"standard stuff"
}
```

Allocations Hooks for Profiling       2300 alvec (...) {
"standard stuff"
...
If (s_do_profiling_work)         2303
    s_do_profiling_work_for_allocations(...);
...
"standard stuff"
}

S_ok_malloc(...) {
"standard stuff"
...
If (s_do_profiling_work)         2304
    s_do_profiling_work_for_allocations(...);
...
"standard stuff"
}

*Fig. 23*

S-PLUS® Workbench Debugger
Simple Use Case Scenario

- designing a fibonacci function:
  - 1,2,3,5,8,13,21,34, ...
- in essence, the ith number is the sum of (i-1)th and (i-2)th number:

```
fib <- function(nth) {
    if (nth==1 || nth==2) {
        fib.val <- nth
    } else {
        fib.val <- fib(nth-2) + fib(nth-1)
    }
    fib.val
}
```

*Fig. 24A*

Debugging Using Workbench

- Create project and add fibonacci function to project:

*Fig. 24B*

Debugging (cont.)

- Switch to Debug perspective:

Debugging (cont.)

Set breakpoints: Breakpoints can be added to any function by double-clicking in the function's editor's left margin (to get open an editor for a function, you can use the CTRL-click functionality described later or the Edit command), right-clicking the editor's right margin, using the Debug perspective's Run-Toggle Line Breakpoint, or using CTRL-Shift-B.

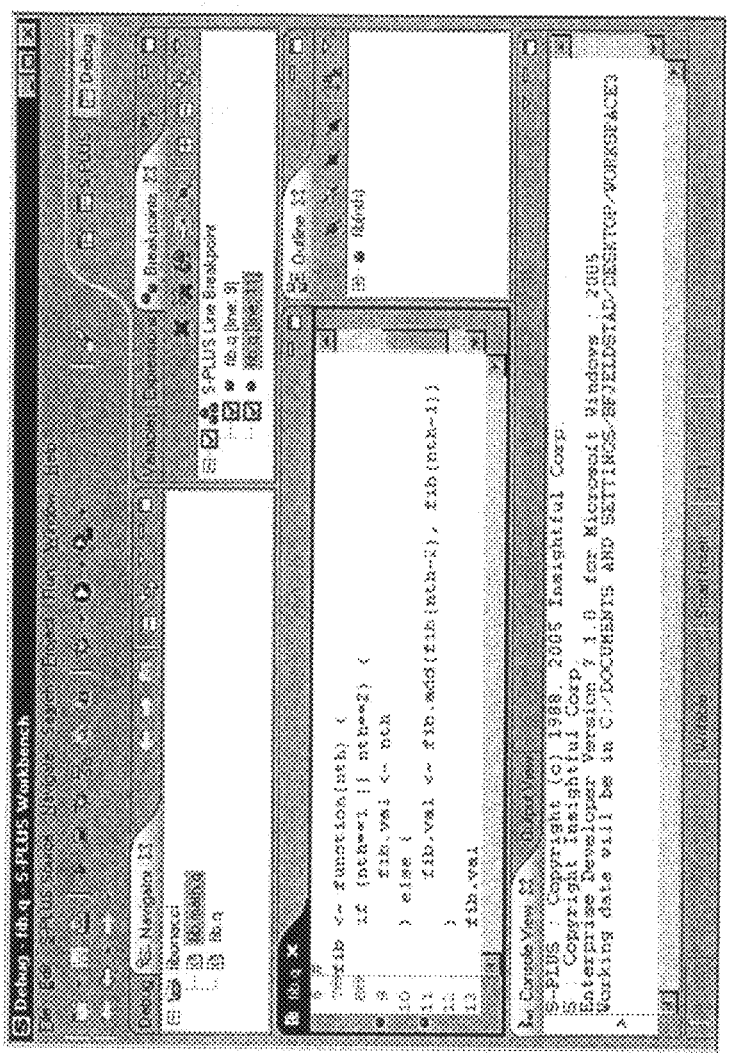

Fig. 24E

Debugging (cont.)

- To start debugging, set the debug mode with the debug toolbar button:

- Then, enter an expression into the Console View:

Debugging (cont.)

- Or, highlight some text and use the Run toolbar button:

Debugging (cont.)

- The fib function should be stopped at the summation breakpoint in the first fib call. You can verify this by inspecting the Variable View (where nth is described) or the Debug View (where the call stack is described).

Debugging (cont.)

- Whenever the execution is stopped (by breakpoint, stepping, etc), the debugger displays the current location in an editor. In this case, after searching all of the projects, one file (fib.q) was found containing a function definition for fib. This file was activated and the breakpoint location was highlighted. If there are no local definitions, the S-PLUS engine will be queried for a function definition and a temp file will display the function and location. If there are several local definitions of fib, you will be prompted to choose one:

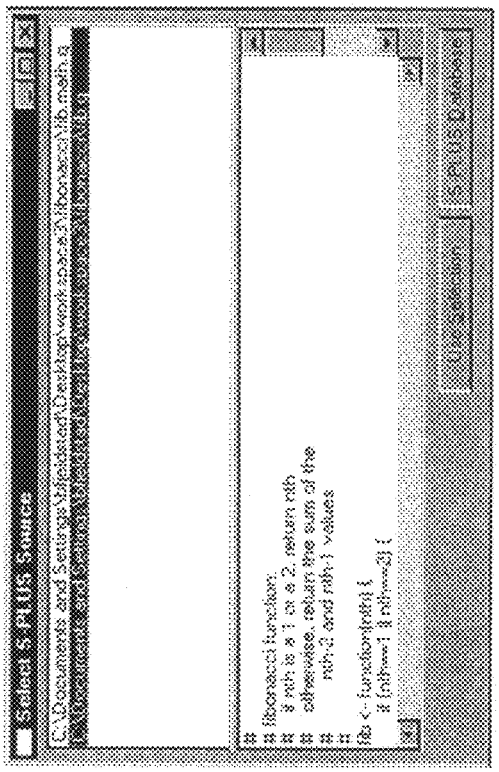

*Fig. 24I*

Debugging (cont.)

- The common debugging functionality of: Step Over, Step In, Step Return, Continue, & Stop, etc. are all available

Debugging (cont.)

- The Call Stack will continue to reflect the current execution:

Debugging (cont.)

- Breakpoints can be added, disabled, enabled or removed along the way:

Debugging (cont.)

* At any breakpoint or stopping point, the variables at the current frame can be reviewed (these cannot be edited or altered):

Debugging (cont.)

- At any breakpoint or stopping point, expressions can also be evaluated (you can add any number of expressions or edit existing expressions here):

Debugging (cont.)

- There are two other types of breakpoints, Error & Warning Breakpoints. These can be used to stop execution when an SPLUS error or warning is generated:

Profiling

- Can observe the number of times a function is called, the amount of time spent in any given function, and allocation patterns.
- Select toggle menu item on the Run menu of the Debug perspective
- Two views are activated: the Function Call View & the Allocation View

*Fig. 24P*

Profiling (cont.)

- Allocation View for fib(15):

Profiling (cont.)

- Function Call View for fib(15) in a hierarchical format representing the call structure:

Profiling (cont.)

* Function Call View for fib(15) in a table format representing a cumulative accounting:

US 8,087,002 B2

METHOD AND SYSTEM FOR PROVIDING A VISUAL DEBUGGER FOR AN INTERPRETED STATISTICAL LANGUAGE

TECHNICAL FIELD

The present disclosure relates to methods and systems for debugging code and, in particular, to methods and systems for debugging code written in an interpreted statistical language using a graphical user interface.

BACKGROUND

Debugging code is rarely an easy part of programming. Debugging programs ("debuggers") have been around a long time, especially as used with compiled languages. Older generation debuggers allowed a programmer to sometimes set breakpoints to stop execution, and examine values of one or more variables, or even perhaps the call stack of the program. One of the features of some modern debuggers is that they can point the programmer to a line in source code where execution ceased or was paused. That way, a programmer is able to at least narrow the focus of an error and attempt to find the problem. With visual debuggers, the corresponding position in the source code is sometimes highlighted or otherwise given emphasis, so that the programmer can have context while debugging. This feature is particularly apparent in Interactive Development Environments ("IDEs") such as Eclipse, where a graphical user interface (a "GUI") commands and integrates many programming tasks, from editing, to compiling, to testing code. Debuggers are typically able to lead a programmer to a corresponding location in source code when the parser of the language produces some form of data structure that is cross-referenced to the source code.

In compiled languages, many compilers support compile-time flags for generating symbolic information that can be used by a debugger invoked at some later time to process the code. For example, using compile-time flags, source code line numbers can be inserted into the produced code so that they become part of the available information of a parse tree and/or the produced object code or bytecode. That way, when a parse tree is constructed and then evaluated by a debugger, the debugger can "walk" down the parse tree and still be able to determine what source code language statement corresponds to the parse tree node where execution was stopped. Of course, nothing comes without a price. Here, execution speed is typically traded for inserting such symbolic information, and execution speed often suffers when compile-time debugging flags are used to produce executable code. Thus, the code used for debugging is rarely the same code as that released to production.

In contrast to compiled code, debugging code that is written in an interpreted language poses a challenge. Interpreted language environments are often used for fast prototyping and in situations where dynamic responses are at a premium. Execution speed is paramount in such uses—customers would be unhappy if an expression to be evaluated was sent to the language interpreter and it took minutes to respond. Some interpreters generate intermediate code and bytecode which are then evaluated by a bytecode virtual machine. However, often, interpreted code is directly parsed and evaluated immediately, with simply a result remaining. Thus, generating information that can be used by a debugger while evaluating an expression in an interpreted language is difficult, and primitive commands such as examination of the call stack are typically what are provided.

Currently for debugging the S-PLUS® language, command-line antiquated (non visual) debugging is performed through the use of specific commands. For example, programmers can insert "cat" or "print" statements at specific spots within their programs to generate output statements at crucial locations, such as to print a value of a variable or a return value of a function. Such statements require a lot of forethought, are cumbersome to create, and may lead to accidental debug code left in place. Other commands are available to trace the call stack and/or to examine values after an error has occurred. Thus, commands such as "trace( )" and "try( )" provide a kind of "post-mortem" debugger and not prospective or dynamic debugging that occurs while code is being executed. Limited capability is available through the inspect( ) command, which allows a programmer to step through execution of a function, expression by expression, permits limited breakpoint ("mark") support, but doesn't support placing arbitrary breakpoints in the code. Also, limited capability is available by inserting a browser( ) command in the source code directly, which causes execution to pause, but no further step debugging is supported—information regarding location is provided.

Figure 1:
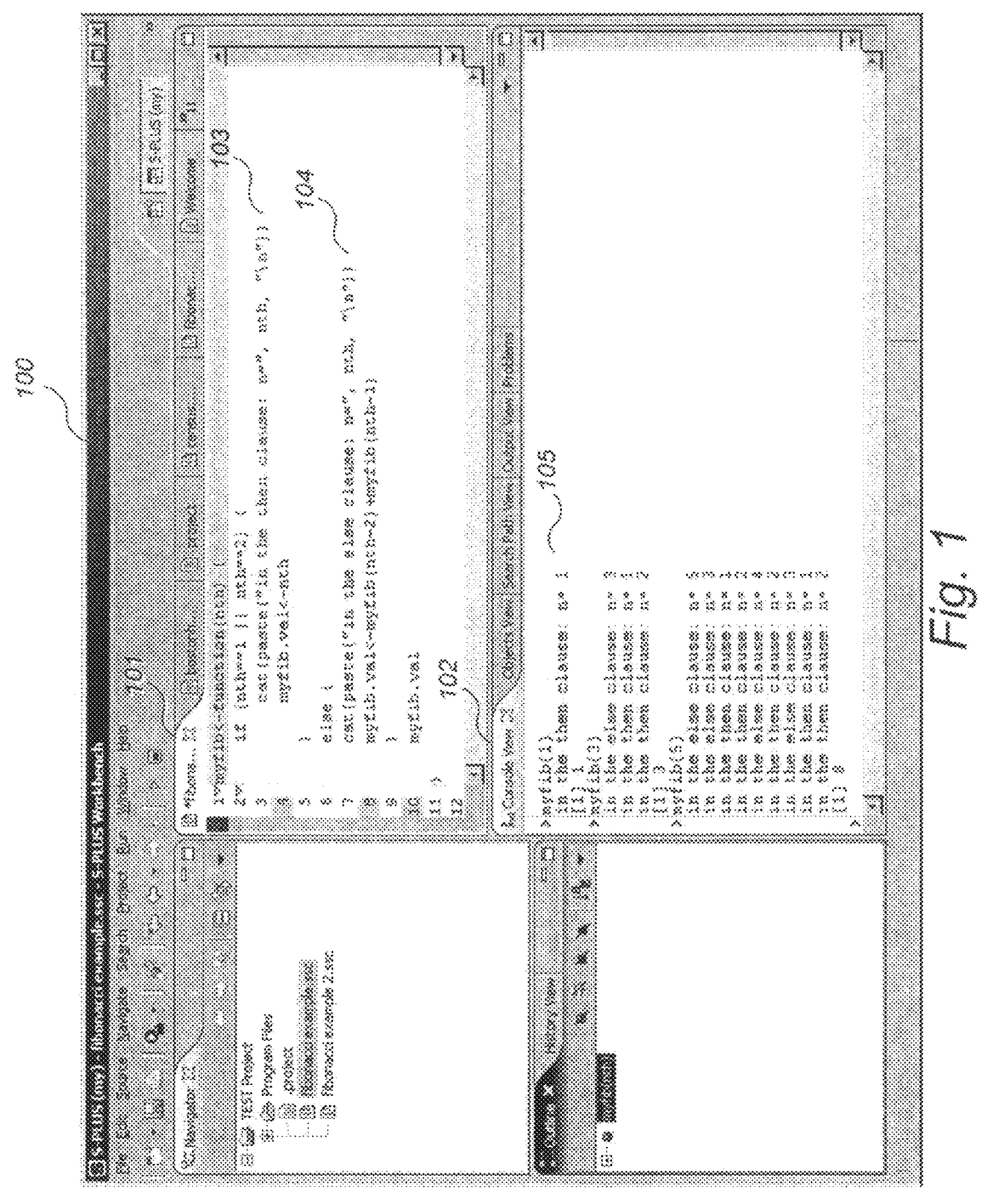

FIG. 1 is an example screen display of using printing statements to debug a function. In FIG. 1, a function that computes the Fibonacci series of a given number has been defined in an S-PLUS® script 101. Two debug statements 103 and 104 have been added to the code to give information to the programmer. The result of executing the function defined in script 101 is shown in Console View 102. As can be seen by the output 105, debugging this way is cumbersome, can generate long output (especially if this was executed on a more complex statistical function) and can be difficult to work through.

Note that S-PLUS is a registered U.S. trademark of Insightful Corporation, whether or not expressed herein in conjunction with the "®" symbol.

BRIEF DESCRIPTION OF THE DRAWINGS

FIG. 1 is an example screen display of using printing statements to debug a function.

FIG. 4 is an example screen display of a menu of the debugging functions available when a breakpoint is encountered.

FIGS. 5 and 6 are example screen displays that demonstrate capabilities of the Variables View of an SPWD.

FIG. 21 is an example of pseudo-code for a modified version of the main evaluation code of the S-PLUS Engine.

FIG. 23 is an example of pseudo-code for a modified version of the memory allocation routines of the S-PLUS Engine.

DETAILED DESCRIPTION

Figure 2:
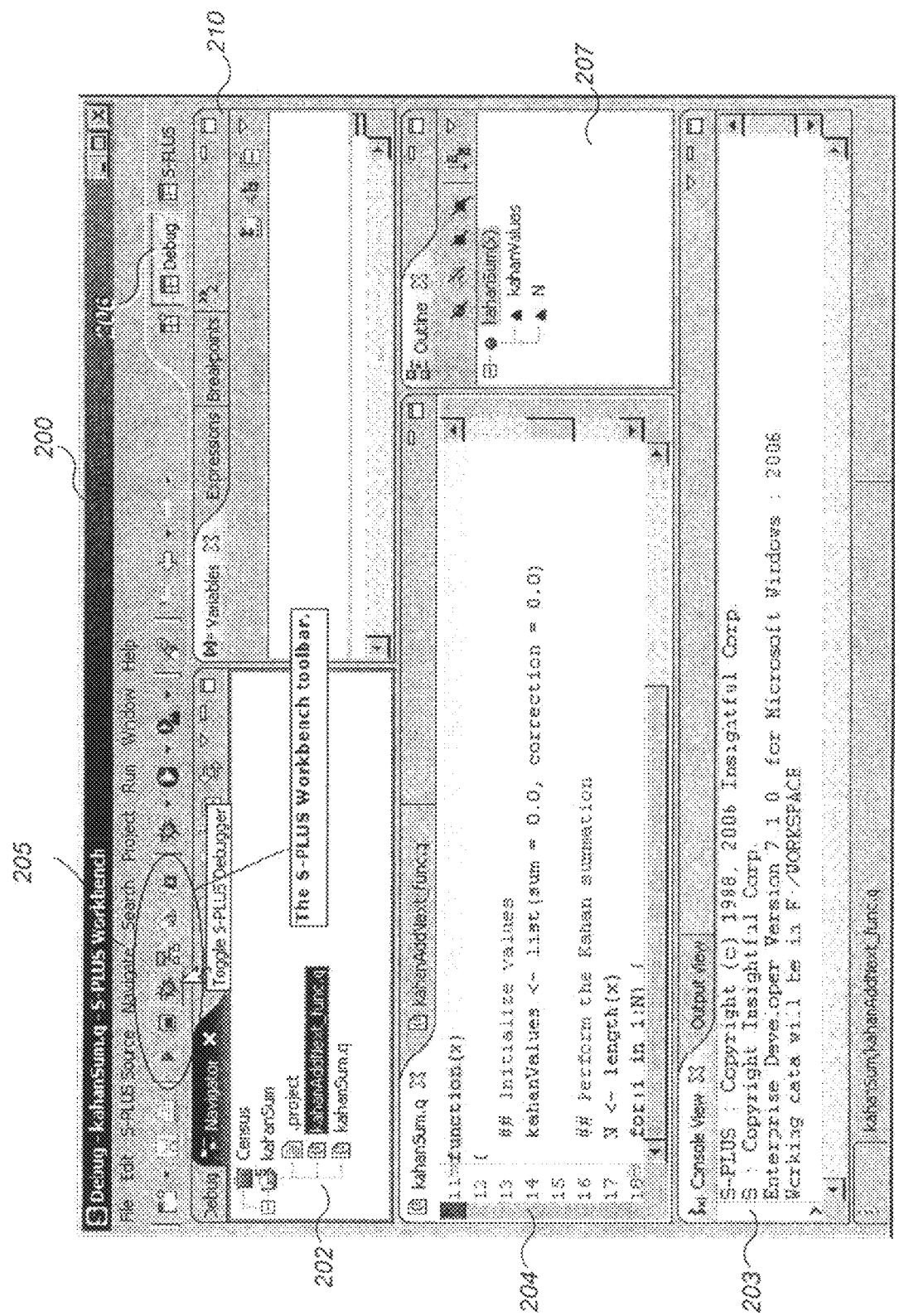
FIG. 2 shows an overview of how a user transitions the Workbench into a "debug" mode, thereby presenting and interfacing through a Debug Perspective.

Embodiments described herein provide enhanced computer- and network-based methods and systems for visual debugging of an interpreted language in, for example, an IDE. In particular, these embodiments provide for debugging of a statistical interpreted language, whose execution speed needs are of paramount concern, since statistical functions and analytic tools often consume a great deal of processing (and even perhaps input/output) resources. Example embodiments provide an S-PLUS Visual Debugging System ("SPVDS"), which includes an S-PLUS Workbench Debugger ("SPWD") that provides "step-based" visual debugging, enabling programmers to step through execution of expressions (S-object evaluation) by setting and otherwise managing breakpoints, examining the call stack, values, types, etc. of variables and expressions, and controlling (stepping through) execution such as by step, step-in, step-out, step-over, continue, stop commands. All of these features are provided in the environs of an IDE that supports visual aids, such as highlighting corresponding source code statements, when such debugging takes place. In addition, the SPWD provides a profiler which tracks the number and duration of calls to functions and the amount of memory allocated to variables.

In one exemplary embodiment, the SPWD is provided as a plug-in to the Eclipse IDE for the S-PLUS language. The Eclipse IDE offers a visual debugging interface. However, the Eclipse debugging interface is targeted and has been used primarily to debug compiled languages—which more aptly fall into a write, compile, test cycle that is repeated when errors are encountered. Interpreted languages are far more difficult to support—and, typically, when expressions are evaluated, their values become part of the dynamic environment in which additional expressions are run and evaluated. Thus, debugging such languages in an IDE is a challenge.

The S-PLUS Eclipse IDE Debugger plug-in (the SPWD) provides many of the Eclipse GUI debugging functionality, all with minimal changes to the underlying S-PLUS Engine (the interpreter/evaluator) so as to maximize execution speed. Thus, the SPWD can invoke the same S-PLUS Engine interpreter and parser for debugging purposes as used for standard S-PLUS evaluation of expressions—no equivalent of special compile-time flags to generate symbolic information is necessary. For the purposes of this description, note that no distinction is made between an interpreter and an evaluator. The S-PLUS Engine refers to one or more code modules that are used to interpret expressions, by parsing them and then evaluating the parsed output. Although some interpreters produce bytecode or an intermediate object code, which is then executed by a corresponding virtual machine, the S-PLUS interpreter produces a parse tree which is evaluated by walking the nodes of the tree arranged according to the S-PLUS language grammar, producing result output on the way as specified by the actions of each node. As deployed in release S-PLUS 7, the S-PLUS parser is written in C and generates a lean parse tree that contains no information regarding corresponding source code or line numbers. This allows the S-PLUS interpreter to parse and evaluate expressions very quickly—an essential feature for a statistical language.

The SPWD accomplishes Eclipse GUI debugging capability by using a secondary parser, currently implemented in Java, to produce a parse tree for use in the IDE that includes corresponding references to source code. Standard debugging features such as breakpoints, and other debugging address locations are generated using the secondary parser. These debugging address locations are used in the SPWD (Eclipse side) to perform graphical debugging capabilities such as cross-referencing and highlighting source code in Outline View. When the SPWD communicates with the S-PLUS Engine (S-Engine side), these SPWD address locations (e.g., SPWD breakpoint definitions) are resolved (mapped) as needed into memory addresses of nodes in the parse trees produced by the S-PLUS Engine. Thus, the S-PLUS Engine can be used with a single hook in the eval( ) routine to check if debugging is turned on, and, if so, cause appropriate debugging behavior to be performed related to breakpoints that it understands in its own language—memory addresses. The S-PLUS Engine need not know about line numbers in source code. This is an important distinction from other parsers and evaluators used for visual debugging. The debugging functionality is then provided by separate routines that do not slow down execution of the S-PLUS Engine evaluation except when is debugging mode is turned on. In addition, the parse trees created by the S-PLUS Engine are not expanded with debugging information; thereby, keeping them lean and preserving evaluation efficiency. Moreover, the S-PLUS parser remains unchanged, which is a critical feature for stability purposes since the language is used extensively under production conditions.

Figure 24C:
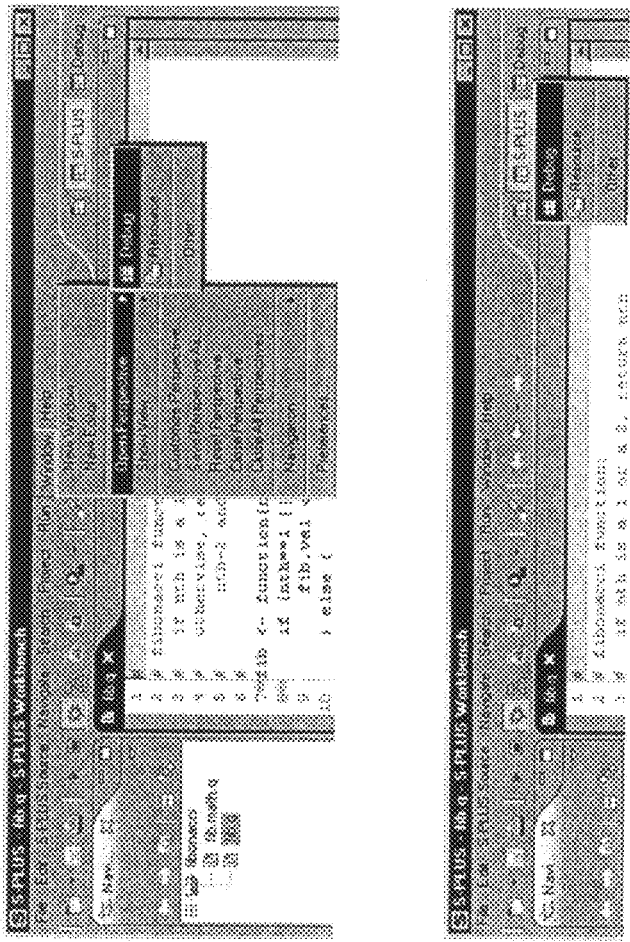
FIGS. 24A-S through an example use case provide a brief overview of the visual debugging and profiling capabilities of the S-PLUS Visual Debugging System
Figure 24D:
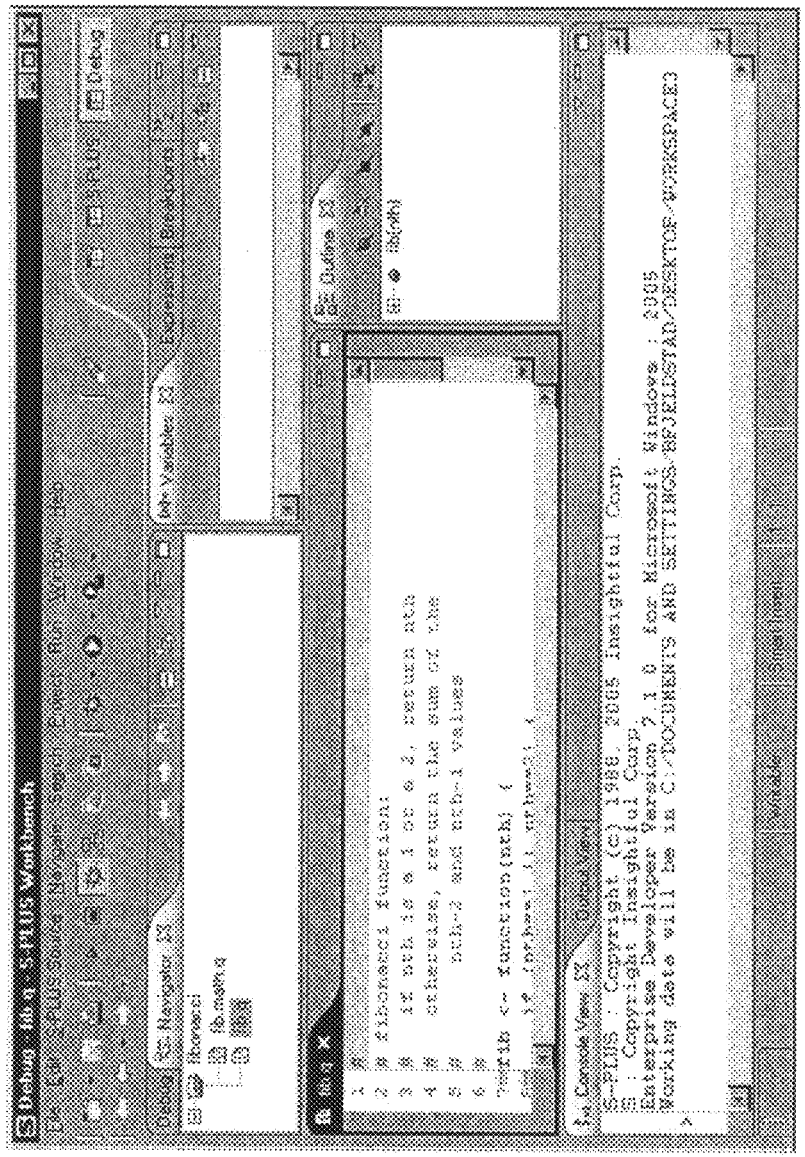
Figure 24F:
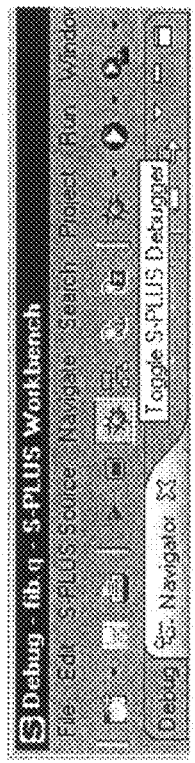
Figure 24F:
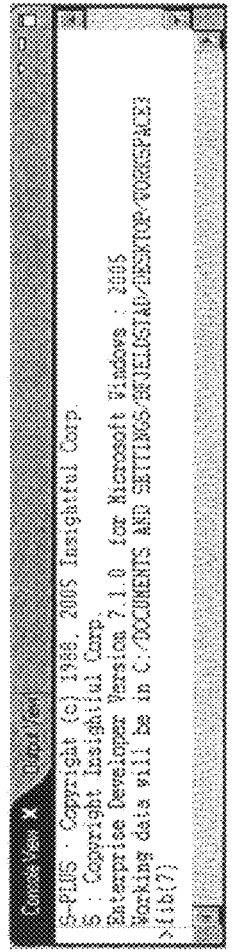
Figure 24G:
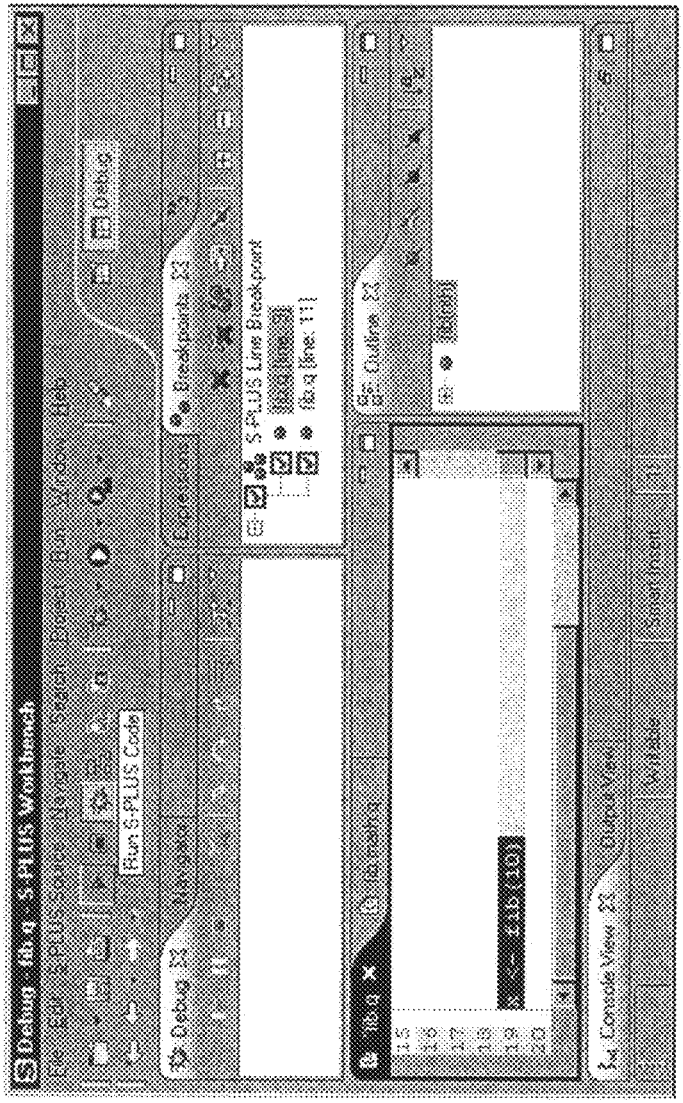
Figure 24H:
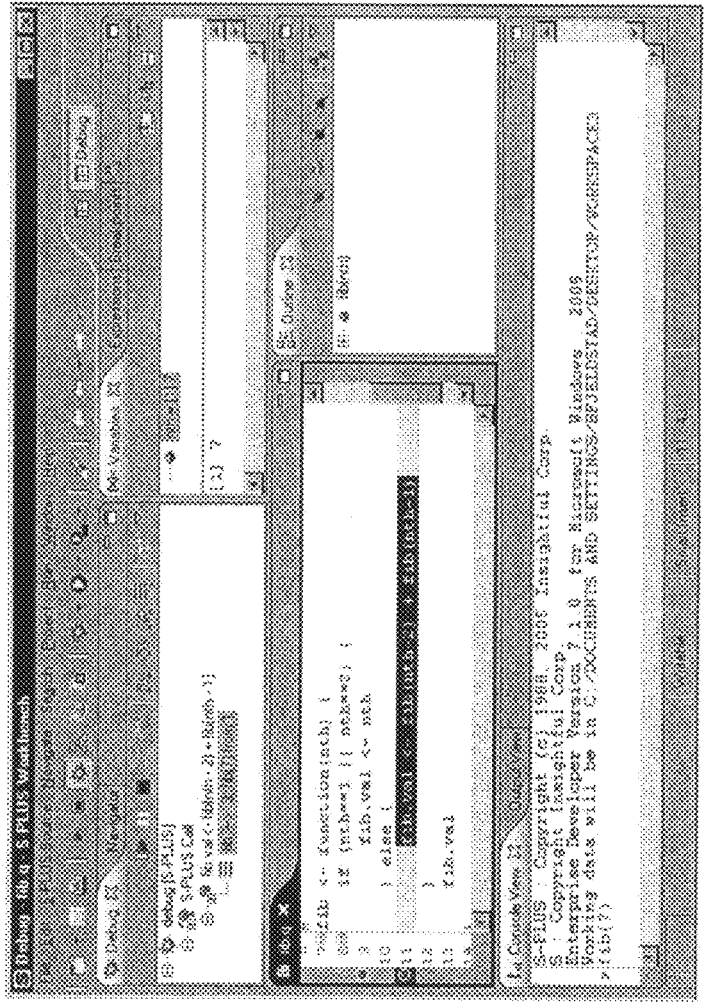
Figure 24J:
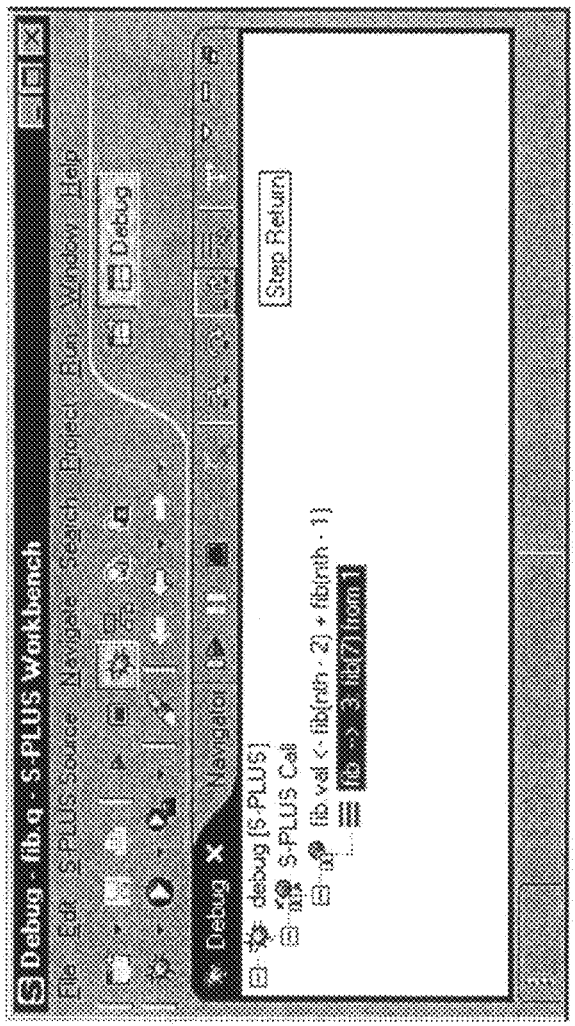
Figure 24K:
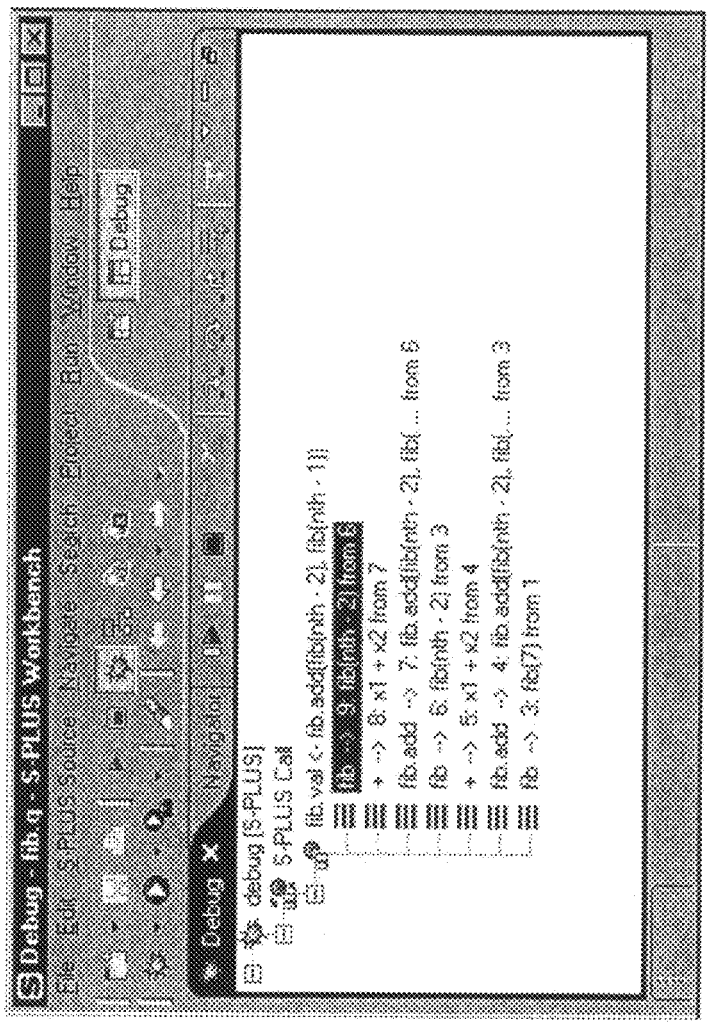
Figure 24L:
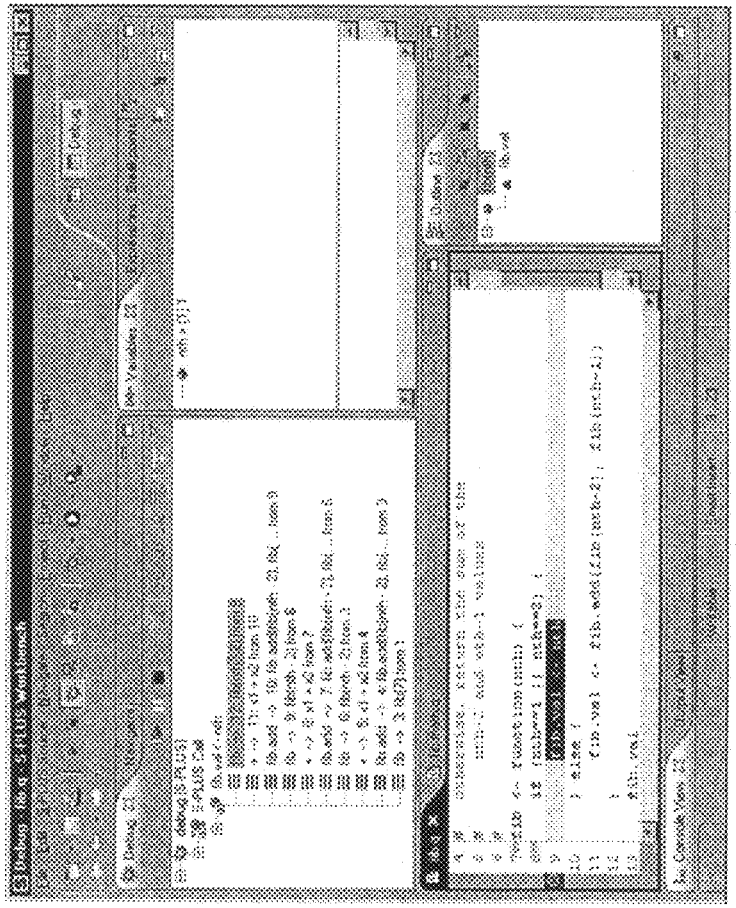
Figure 24M:
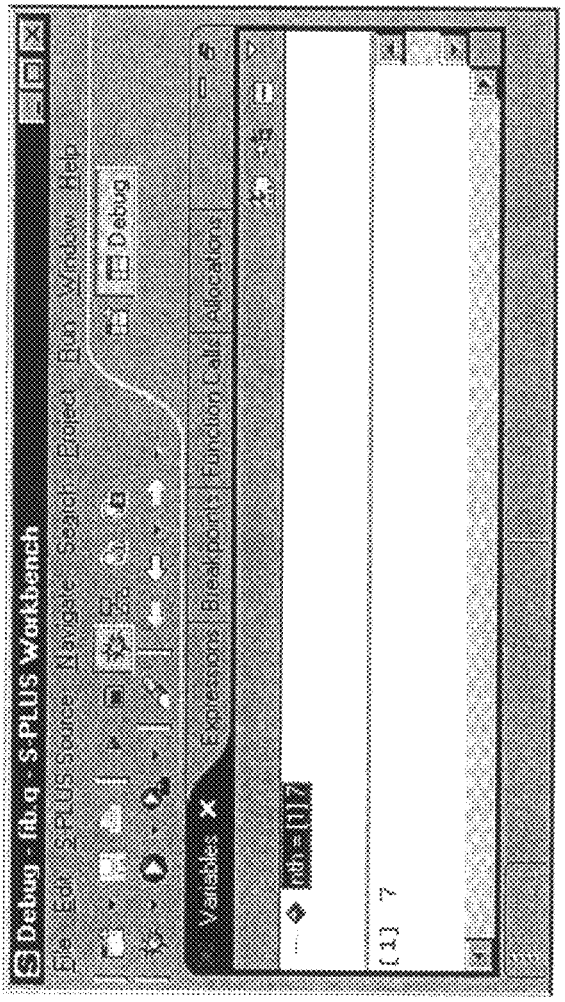
Figure 24N:
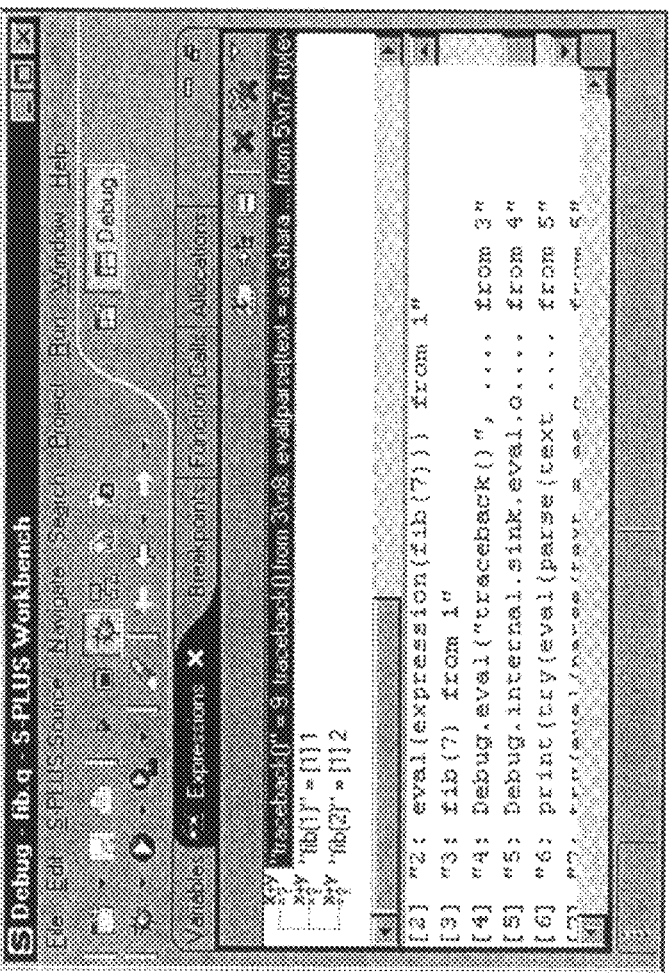
Figure 24O:
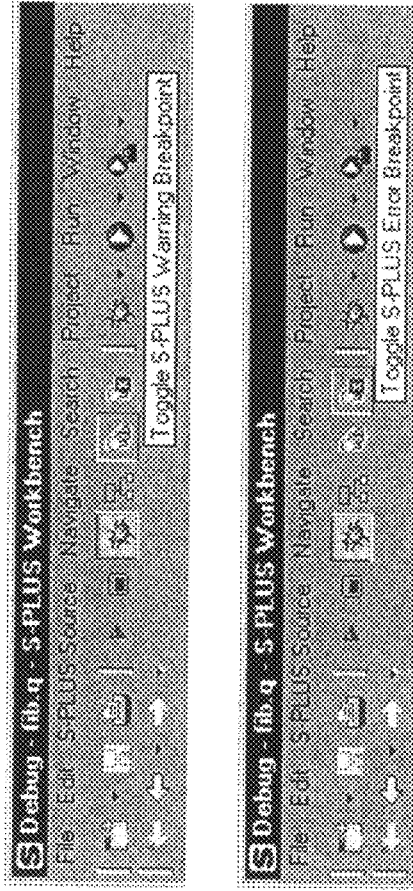
Figure 24Q:
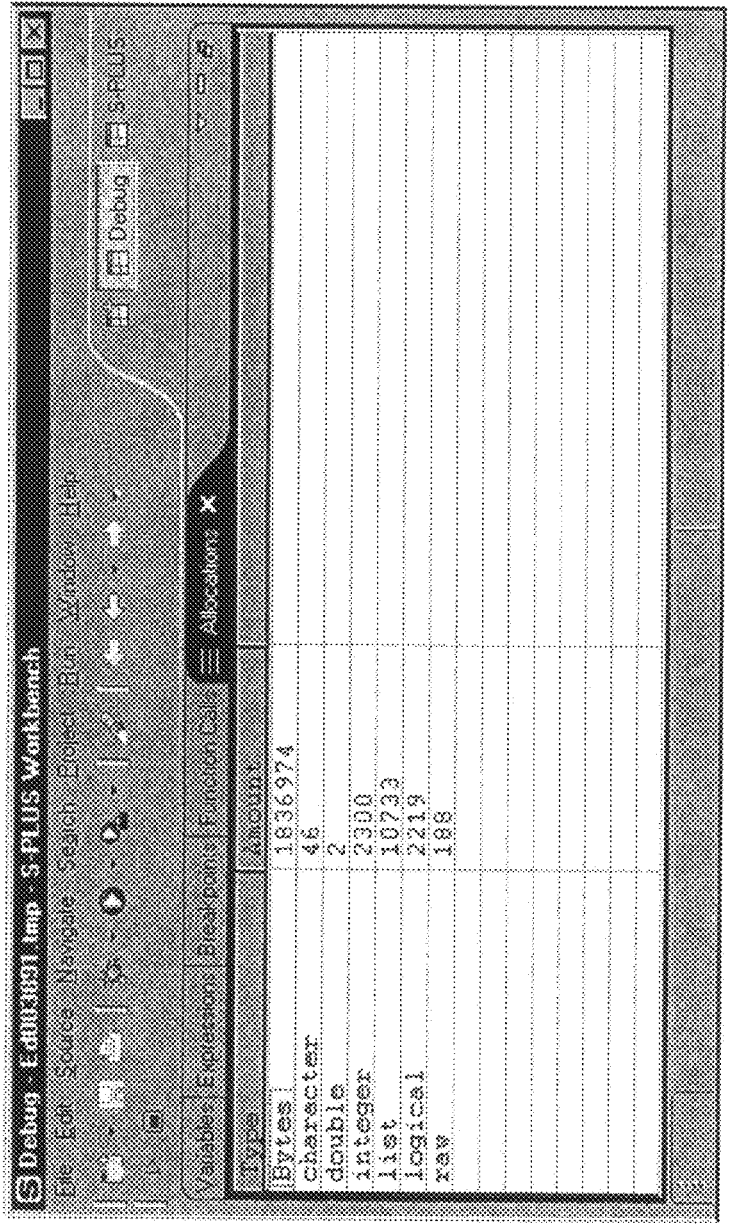
Figure 24R:
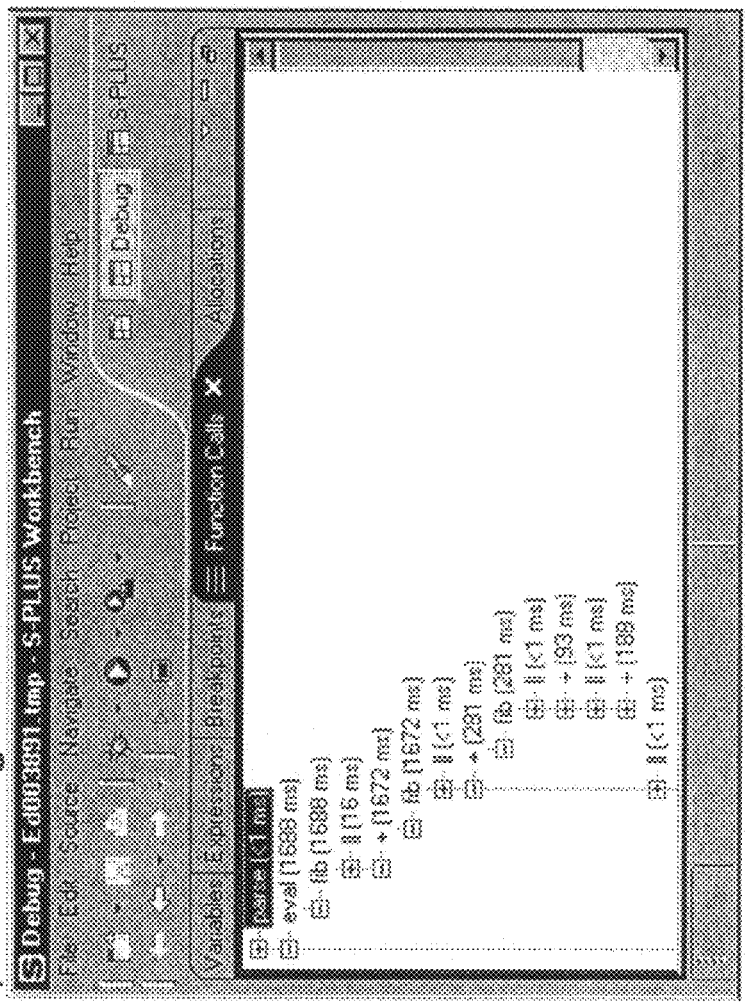
Figure 24S:
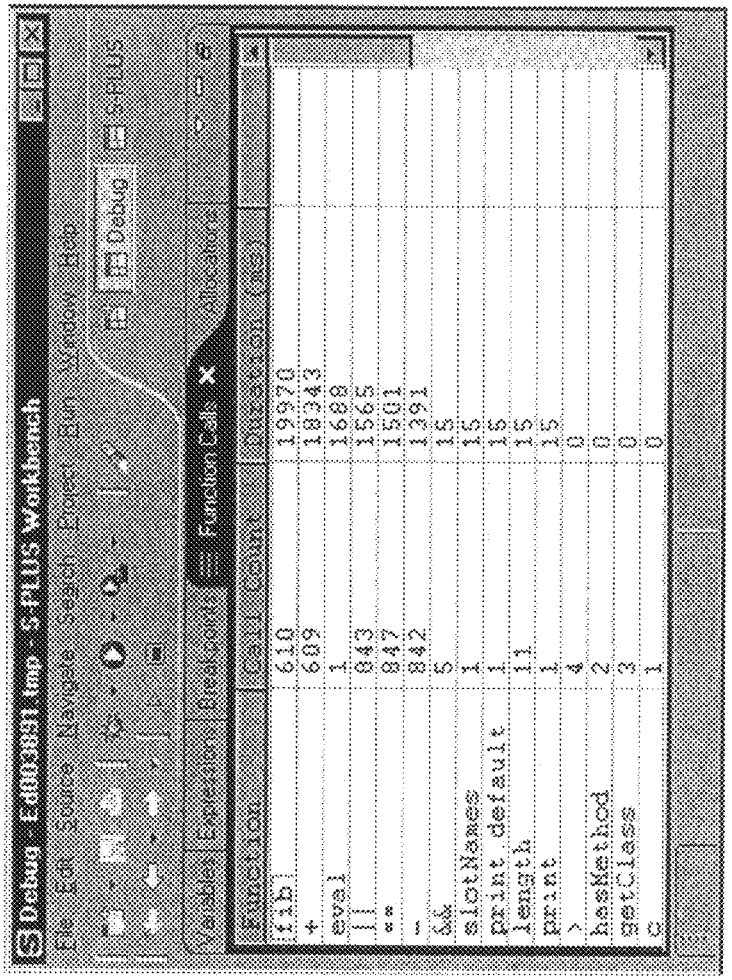

FIGS. 24A-S through an example use case provide a brief overview of the visual debugging and profiling capabilities of the S-PLUS Visual Debugging System. In FIGS. 24A-S, the debugging of a Fibonacci function is walked through. One embodiment of the SPVDS provides a Debug Perspective as part of the S-PLUS Workbench, the S-PLUS plug-in for an Eclipse IDE, provided for release 8 of S-PLUS. The Debug Perspective provides a user interface for debugging expressions created using the S-PLUS language. Appendix A, incorporated herein by reference in its entirety, describes details of a user interface of one embodiment of the Debug Perspective of the S-PLUS Workbench, Release 8.0. The abstract notion of a Debug Perspective is a feature of Eclipse, however, it has been implemented and enhanced by the S-PLUS Debug plug-in. This description presumes that the reader is familiar with S-PLUS and with Eclipse. If not, there is a variety of documentation available in the public domain, which describes the S-PLUS language in detail, statistical programming, and use of an Eclipse environment.

FIGS. 2-11 are example screen displays of various aspects of the S-PLUS Workbench Debugger capabilities as provided by the user interface. FIG. 2 shows an overview of how a user transitions the Workbench into a "debug" mode, thereby presenting and interfacing through a Debug Perspective. In FIG. 2, the user presses the Debug button 205 to toggle the SPWD into debug mode. The tab 206 indicates that the user is viewing the system through the Debug Perspective. From this perspective, many standard "views" are still available, including the Navigator View 202, an Editor View 204, a Console View 203, and an Outline View 207. In addition, various debugging and profiling views are shown in the area 210.

Figure 3:
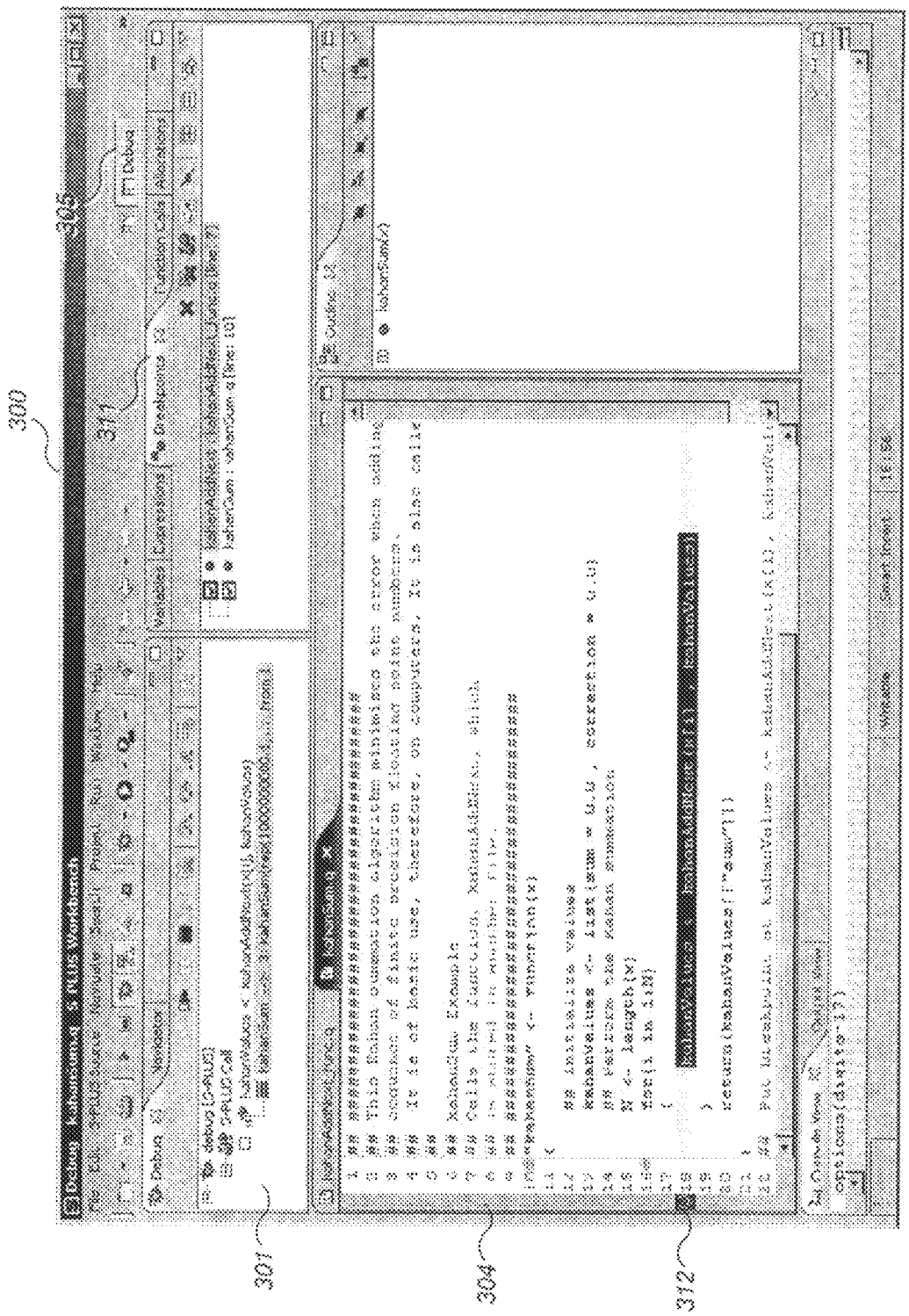
FIG. 3 is an example screen display of debugging in action within the SPWD.

FIG. 3 is an example screen display of debugging in action within the SPWD. The Debug Perspective 300 includes a Debug View 301 that shows a call trace of the function being debugged. The function source code is currently shown in the Editor View 304. Within this view, the programmer has set a breakpoint 312 on line 18 of the source code. A list of the current breakpoints is displayed in Breakpoint View 311.

Figure 4:
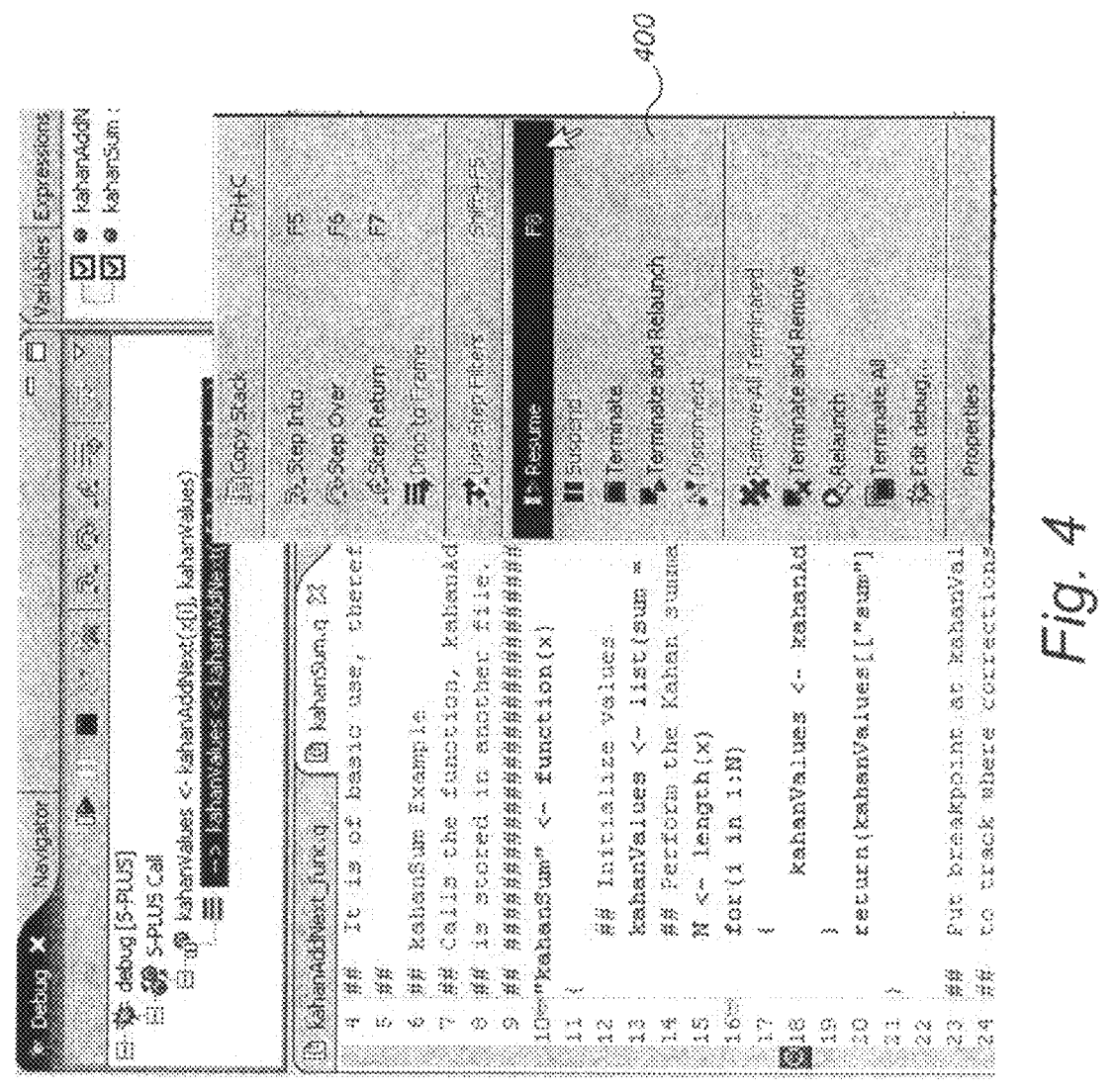

Once a breakpoint is set, then when the S-PLUS expression that contains the breakpoint is evaluated, the S-PLUS engine pauses in its evaluation of the expression in accordance with the breakpoint. The communication between the Eclipse side and the S-Engine side is described further below. At that point, the programmer (or other user) can perform various debugging actions, including step-wise evaluation, stepping over expressions, resuming evaluation, terminating evaluation etc. FIG. 4 is an example screen display of a menu of the debugging functions available when a breakpoint is encountered. The menu 400 is one interface that a programmer can use to perform these functions.

Figure 5:
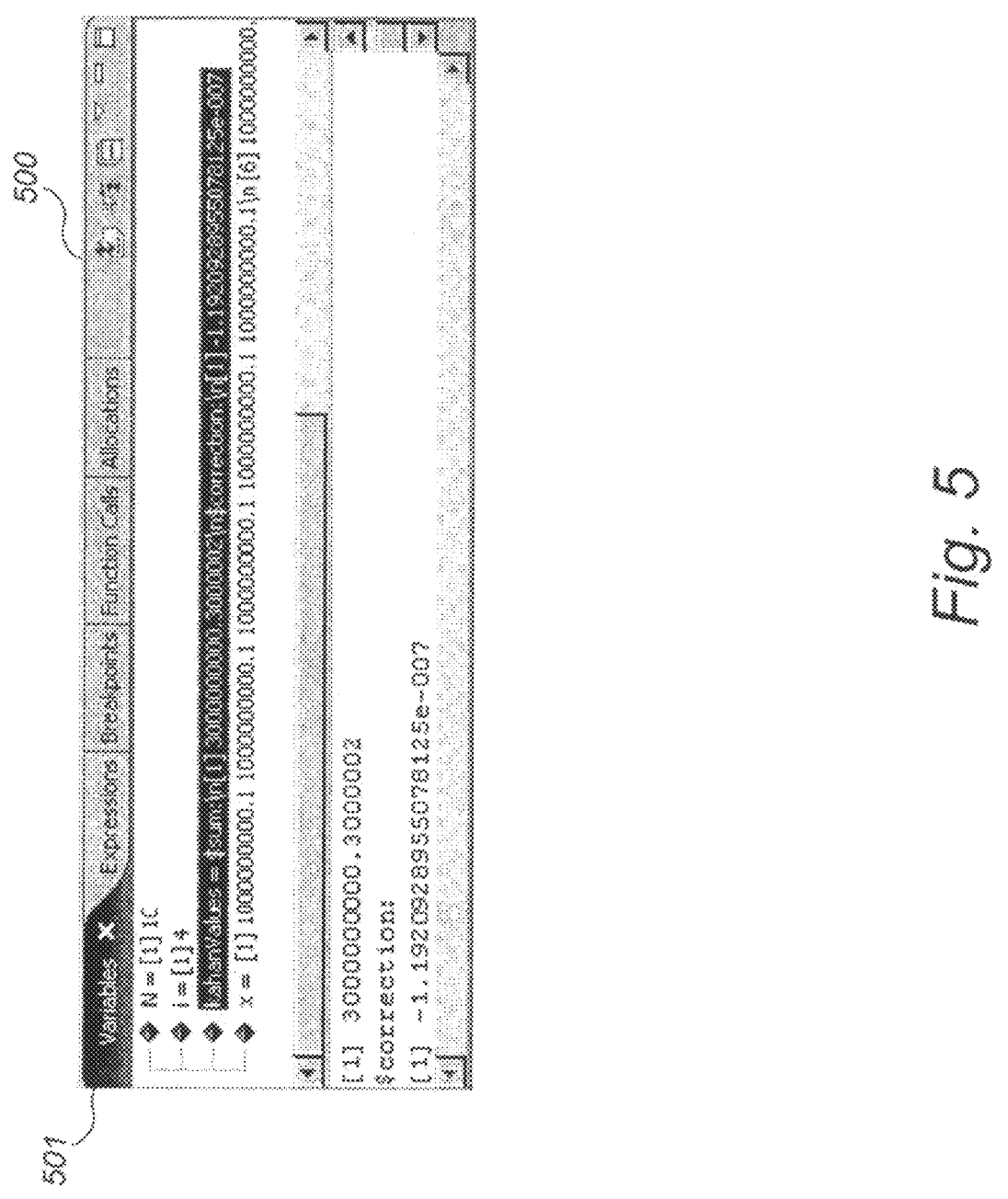
Figure 6:
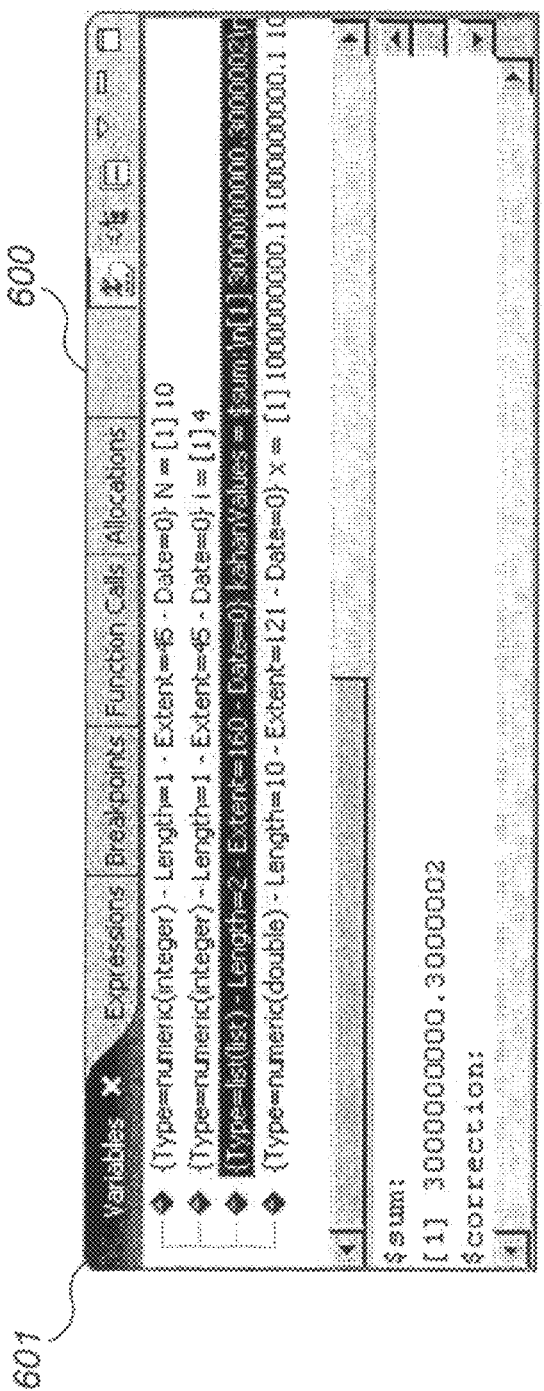
Figure 7:
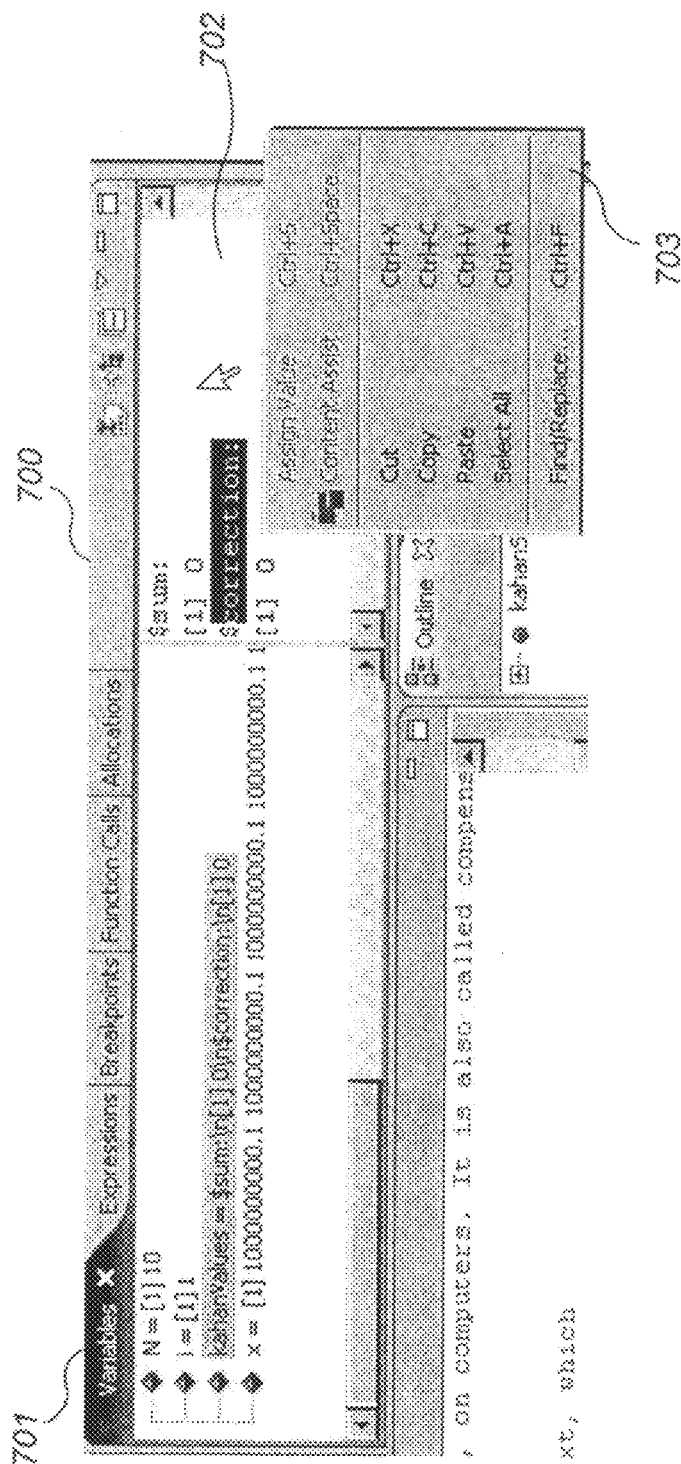
FIG. 7 is an example screen display of details of variables.
Figure 8:
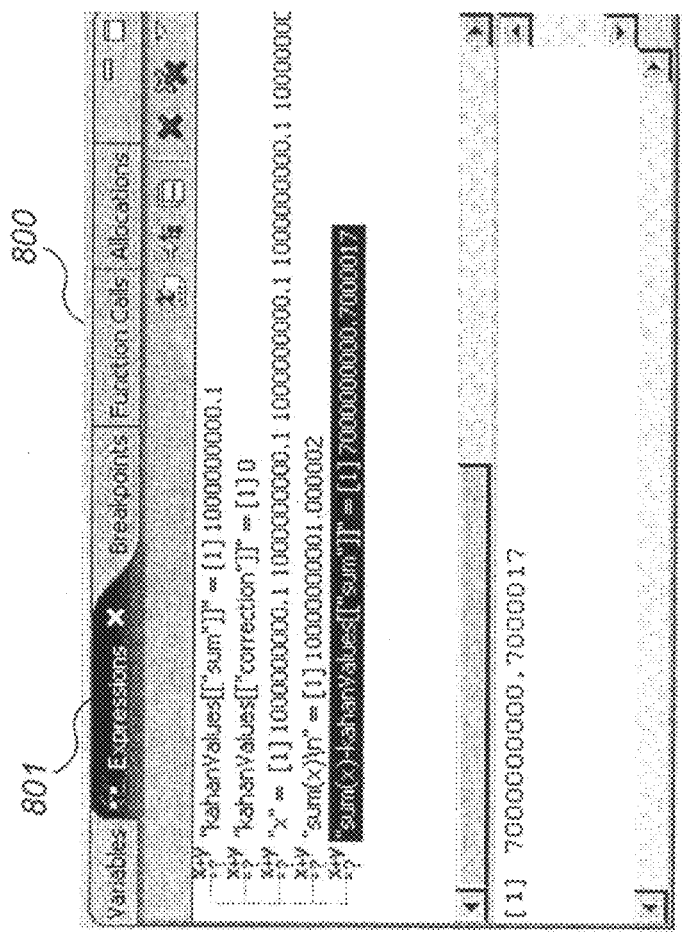
FIG. 8 is an example screen display of the Expressions View of an SPWD.
Figure 9:
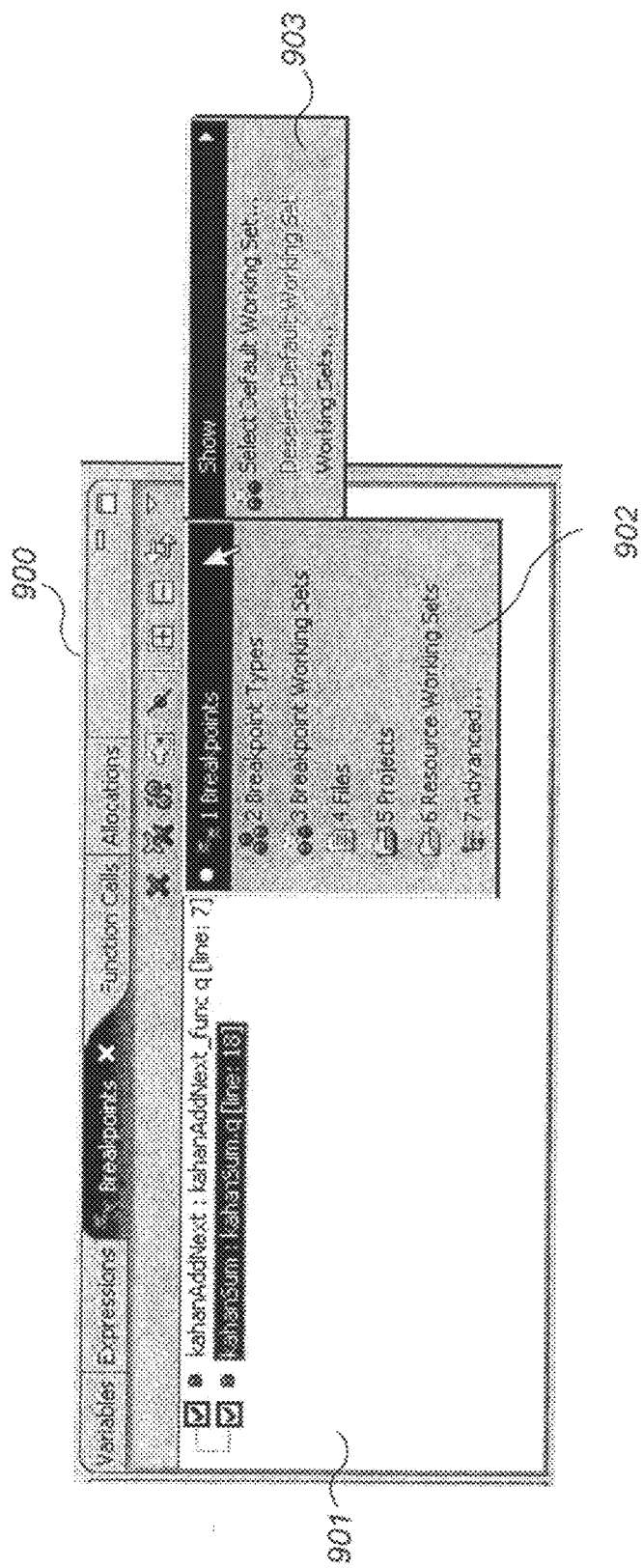
FIG. 9 is an example screen display of a menu used to show various aspects of breakpoints.
Figure 10:
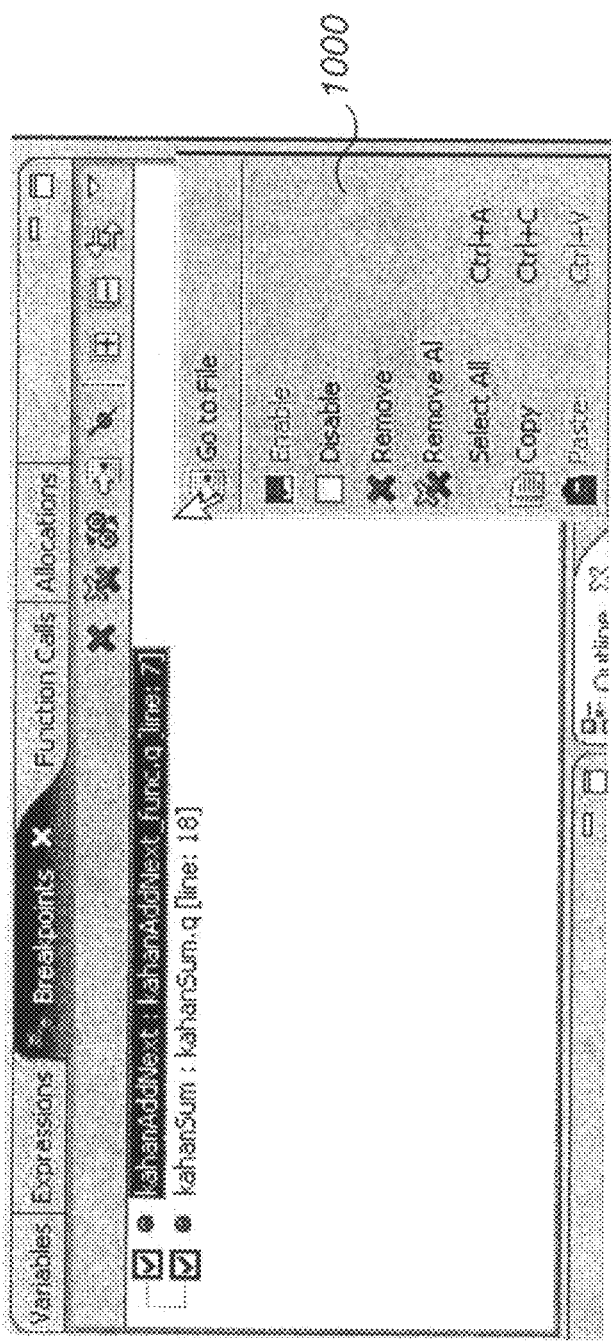
FIG. 10 is an example screen display of a menu used to show organization of breakpoints.

FIGS. 5-10 highlight some of the features available through the specific views supported by the SPWD. FIGS. 5 and 6 are example screen displays that demonstrate capabilities of the Variables View of an SPWD. The Variables View (501 and 601) can display variable values as well as the type of variables. FIG. 7 is an example screen display of details of variables. In FIG. 7, the Details Pane 702 shows the various sub-values (separately) of the variable displayed in Variable View 701. Note that in the Details Pane 702, depending upon the implementation, the variable values may or may not be able to be manipulated. FIG. 8 is an example screen display of the Expressions View of an SPWD. The Expressions View 801 shows the values of each expression, for example, as it is stepped through by the programmer. FIGS. 9 and 10 illustrate how a programmer sets and controls various breakpoints in S-PLUS expressions. FIG. 9 is an example screen display of a menu used to show various aspects of breakpoints. Menu 902 is a context menu available in the Breakpoints View 901. By selecting the sub-menu 903, the programmer can display all of the currently set breakpoints. By grouping breakpoints, the programmer can disable or enable them as units, as shown further in FIG. 10.

Note that the SPWD supports setting and manipulation of breakpoints outside of the file in which the programmer is working. For example, if a breakpoint is desired for a function defined outside of the file that defines the function currently being evaluated, for example, in FIG. 9, then the SPWD associates a temporary file with the function and associates breakpoints relating to it with a resource known to the SPWD. Such breakpoints are persistent, and when the SPWD is invoked in a subsequent session, it queries the resource to reestablish such breakpoints. FIG. 10 is an example screen display of a menu used to show organization of breakpoints. The programmer can define groups of breakpoints and then manipulate them, for example, disable them through single command.

Figure 11:
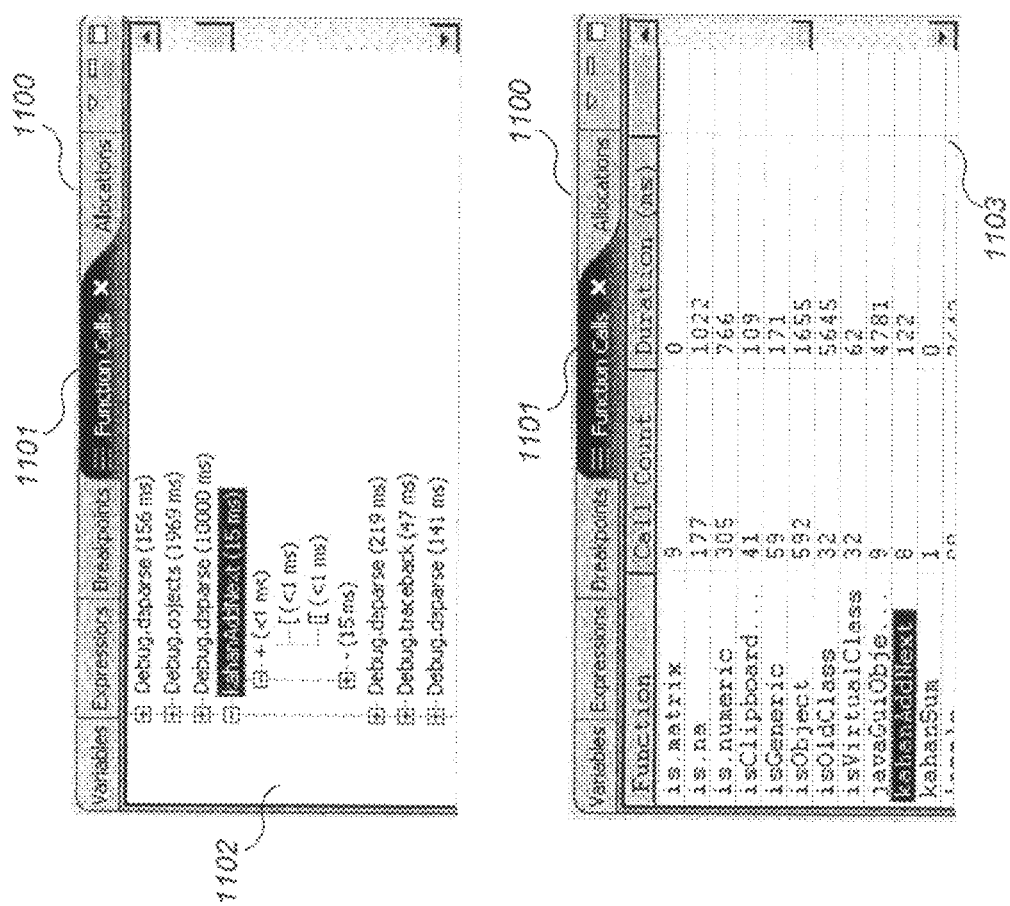
FIG. 11 is an example screen display of a portion of the profiling capabilities supported by the SPWD.

FIG. 11 is an example screen display of a portion of the profiling capabilities supported by the SPWD. In FIG. 11, a Function Calls View 1101 is provided to display the number of times each function has been called, and its duration. An tree display mode 1102 is provided as well as a table display mode 1103. This profiling can be used to determine resource usage in the system as well as to detect looping problems. The Allocations View, not shown, displays the number of allocations per S-PLUS data type that have been performed. This data can help a programmer better plan memory usage, and, for example, determine whether engagement of alternative data structures may be appropriate.

Example embodiments described herein provide applications, tools, data structures and other support to implement a Visual Debugging System to be used for statistical languages, such as S-PLUS. Other embodiments of the methods and systems as described may be used for other purposes. Also, although certain terms are used primarily herein, one skilled in the art will recognize that other terms could be used interchangeably to yield equivalent embodiments and examples. In addition, terms may have alternate spellings which may or may not be explicitly mentioned, and one skilled in the art will recognize that all such variations of terms are intended to be included. In the following description, numerous specific details are set forth, such as data formats and code sequences, etc., in order to provide a thorough understanding of the described techniques. However, the present techniques also can be practiced without some of the specific details described herein, or with other specific details, such as changes with respect to the ordering of the code flow or different code flow or steps. Thus, the scope of the techniques and/or functions described are not limited by the particular order, selection, or decomposition of steps described with reference to any particular routine.

In one example embodiment, the S-PLUS Visual Debugging System comprises one or more functional components/modules that work together to provide an Eclipse-based visual debugging environment. For example, an S-PLUS Visual Debugging System ("SPVDS") may comprise the S-PLUS Workbench Debugger ("SPWD", the Eclipse debugger plug-in); a secondary parser; a debug handler; a profile handler; one or more other modules added to the S-Engine side to implement the breakpoint evaluation, partial execution control, termination, and profiling; and hooks into the eval and memory allocation routines to trigger breakpoint handling and profiling, respectively. As will be described further below, the Debug Handler is responsible for communicating from the S-Engine side with standard interfaces provided by the S-PLUS implementation of the Eclipse debugging interfaces (provided by the SPWD) on the Eclipse side. Similarly, the Profile Handler is responsible for communicating with the SPWD profiling specific views that implement profiling on the Eclipse side. There are corresponding classes (implementations thereof on the Eclipse side, for example, the SplusDebugManager and an SplusProfileManager, to communicate with the Debug Handler and Profile Handler, respectively.

Figure 12:
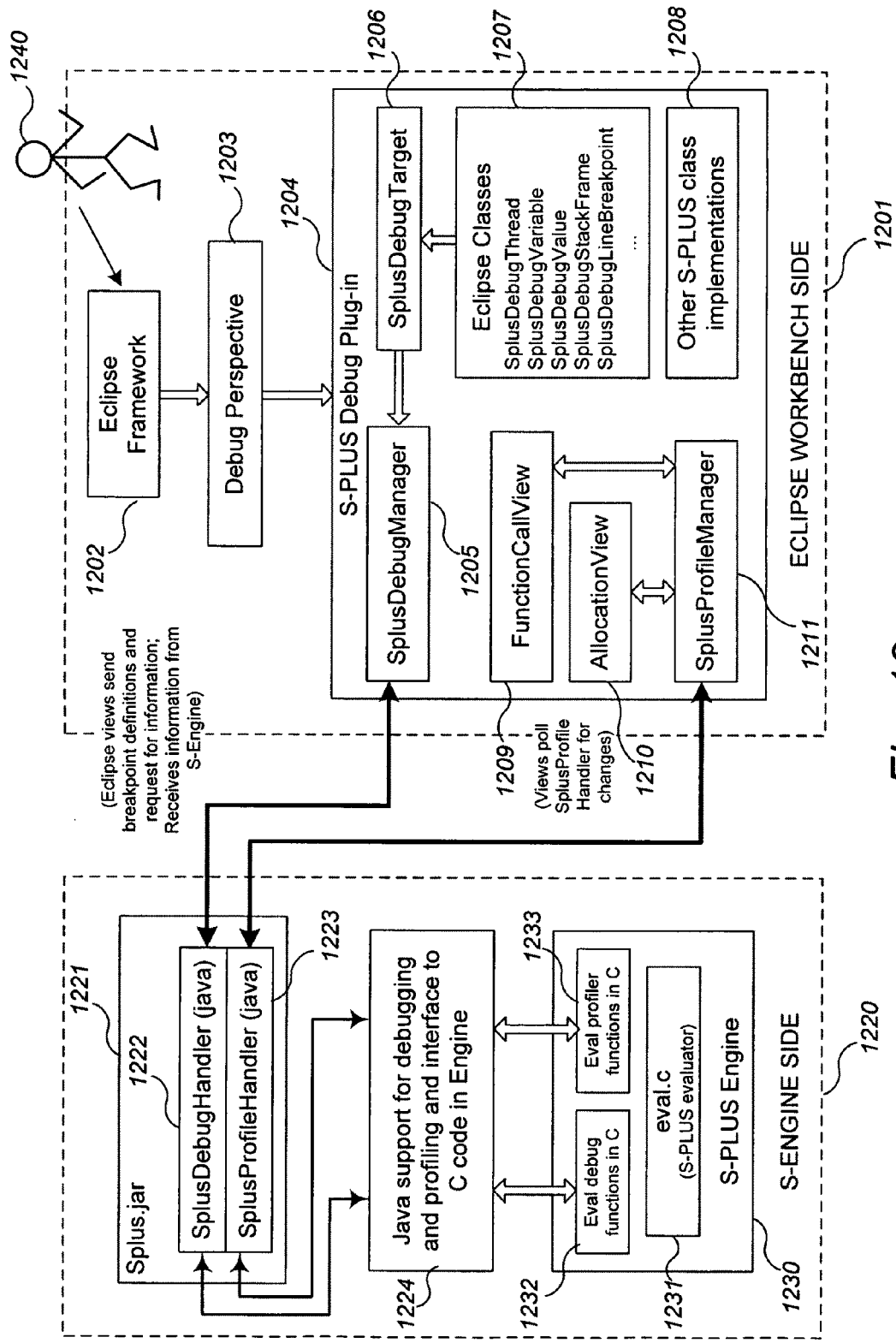
FIG. 12 is an example block diagram of the various components of an S-PLUS Visual Debugging System.

FIG. 12 is an example block diagram of the various components of an S-PLUS Visual Debugging System. In FIG. 12, the modules and components (classes, interface, etc.) that execute as part of the S-PLUS Workbench as they relate to debugging are shown in Eclipse Workbench side 1201. The modules and components that execute as part of the S-PLUS Engine and associated code as they relate to debugging are shown in S-Engine side 1220. (There are other components of both the Eclipse Workbench side 1201 and the S-Engine side 1220, used for a variety of other purposes, which are not shown.) Many different system and process/task/thread configurations can be used to implement the Eclipse Workbench side 1201 and the S-Engine side 1220. For the purposes of ease of description, the components will be described as if the Eclipse Workbench side 1201 components execute in a single process and communicate with the S-Engine side 1220 components (in the same process) using synchronous calling mechanisms, which block as appropriate. However, it is understood that each side 1201 and 1220 could be implemented as separate processes (or as multiple threads) which communicate using standard or proprietary interprocess communication mechanisms, such as remote procedure calls or messaging.

As shown in FIG. 12, the Eclipse Workbench side 1201 comprises the Eclipse Framework 1202, a Debug Perspective 1203, and an S-PLUS Debug Plug-in 1204. In one embodiment, the S-PLUS Debug Plug-in 1204 further comprises, for debugging, an SplusDebugManager 1205, which is responsible for communications with the S-Engine side 1220 for sending and receiving debugging related "messages;" an SplusDebugTarget class 1206; various Eclipse debug classes 1207; and other S-PLUS class implementations as needed 1208. For profiling, the S-PLUS Debug Plug-in 1204 comprises an SplusProfileManager 1211, and a FunctionCallView class 1209 and an AllocationView class 1210. These two view classes 1209 and 1210 are S-PLUS classes not defined by the Eclipse debugging model.

The S-Engine side 1220 comprises the S-PLUS Engine 1230 with its evaluator "eval.c" 1231, debug support functions 1232 and profiler support functions 1233; a Java-based debug handler 1222; a Java-based profile handler 1223; and Java support code 1224 for debugging and profiling and interfacing between the Java-based handlers 1222 and 1223 and the C-based support functions 1232 and 1233.

As mentioned, the S-PLUS Debug Handler 1222 (labeled "SplusDebugHandler") communicates with the SPWD Debug Manager 1205 (labeled "SplusDebugManager") to send and receive messages pertaining to debugging functionality. Note that the term "message" is used here in a generic sense—however the actual request or information is communicated between the components. In one embodiment, the SPWD Plug-in has one or more "listener" classes that register for certain types of events (messages) emanating from the Debug Handler 1222. When the Debug Handler 1222 wants to report debug information, it broadcasts the information to all registered listeners. On the other hand, when the SPWD Debug Manager 1205 sends messages and/or information to the Debug Handler 1222, in a current example implementation it calls functions defined by the Debug Handler 1222. Although in the current example embodiment, the S-Engine side is single threaded and the Debug Handler runs as an instance within the Eclipse process, it is contemplated to adapt the system to a multithreaded and/or multi-process implementation.

The SPWD Debug Manager 1205 sends various messages to the Debug Handler 1222 to implement its debugging interface. For example, the SPWD Debug Manager 1205 may send to the S-PLUS Debug Handler 1222 such messages as follows:

Set Breakpoint
Delete Breakpoint
Here are all the Breakpoints
Toggle Debug On
Toggle Break on Error
Toggle Break on Warning
and various Requests For Information (RFIs)

Typically, once an expression is run and its evaluation is stopped (paused) at a breakpoint, then the SPWD Debug Manager 1205 may send various RFIs to the S-PLUS Debug Handler 1222 to obtain information that is used in the SPWD to provide the visual debugging interface. For example, RFIs may include such messages as:

do (eval paused) debug function <x> and return information (for example, do step into; do step out; do step over; do continue, etc.

a request for current call stack a request for all variables in that call stack (execution frame) and what their values are a request for a string containing an expression that the user has entered, etc.

Other messages and inquiries can be supported.

The S-PLUS Debug Handler 1222 responds to these messages in a variety of ways. For example, in response to the toggle messages (Toggle Debug On, Toggle Break on Error, and Toggle Break on Warning), the Handler 1222 sets an appropriate flag in a data structure used to store the state of the S-Engine. These flags are checked as needed by the various evaluation modules (1231-1233) as needed. An example such Debug State data structure is described with reference to FIG. 13.

In response to the various RFIs, the S-PLUS Debug Handler 1222 may need to determine from a variety of structures (some of which are shown in the Figures that follow) the various information. In some cases, for example the request to do a "step in," results in a debug function being called by the eval module 1231, which returns information via several other modules back to the S-PLUS Debug Handler 1222. An example flow that describes how such debug functions are processed is described with reference to FIG. 22. In addition to the answers to various RFIs, the S-PLUS Debug Handler 1222 notifies the SPWD Debug Manager 1205 when the S-PLUS Engine has paused, for example it has finished stepping. In this case, the Handler 1222 reports the expression in which it stopped. (The S-PLUS Engine can do this by recreating a string from the expression that is represented by where the engine stopped while evaluating a branch of the parse tree, i.e., the evaluator knows what expression its at, it just doesn't have a way to link it back to the source code from the parse tree itself.) In addition, the S-PLUS Engine recreates the current logical address and sends that back to the SPWD GUI, so that the information returned to the SPWD can be properly linked up by the SPWD.

One of the advantages to the example architecture described is that breakpoints can be set, removed, and changed without access to symbolic information from the underlying interpreted language parser.

The S-PLUS Profile Handler 1223 (labeled "SplusProfileHandler") communicates with the SPWD Profile Manager 1211 (labeled "SplusProfileManager") to send and receive messages pertaining to profiling. In an example implementation, these components communicate using polling techniques. That is, the SPWD Profile Manager 1211 polls the S-PLUS Profile Handler 1223 every "n" increments of time (e.g., seconds) for information. Currently the S-Engine side 1220 is responsible for collecting and returning information to requests regarding when a function starts and ends; the type and amount of memory allocated (e.g., for which data structures). The SPWD Profile Manager 1211 is responsible for accumulating the totals for the metrics collected regarding function calls and for the metrics collected regarding memory (data structure) allocations. This allows the S-PLUS Profile Handler 1223 and the related functions within the S-Engine to very efficiently report metrics without worrying about tracking them. Other organizations and implementations are of course possible and contemplated. Also, although profiling is described only with respect to the current GUI that is supported (function call metrics and allocation metrics), other profiling information could be similarly collected by the S-PLUS Engine 1230 and similarly reported through the S-PLUS Profile Handler 1223 to the SPWD Profile Manager 1211. Also, view classes other than 1209 and 1210 could be accordingly supported.

In the example embodiment shown in FIG. 12, components of the S-Engine side 1220 and the Eclipse Workbench side 1201 can be implemented using standard programming techniques. A range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc. In addition, the various components of the illustrated embodiments may be implemented by way of a single monolithic executable running on a single CPU computer system, or alternately decomposed using a variety of structuring techniques known in the art, including but not limited to, multiprogramming, multithreading, client-server, or peer-to-peer, running on one or more computer systems each having one or more CPUs.

In addition, programming interfaces to the data stored as part of the illustrated embodiments can be made available by standard means such as through C, C++, C#, and Java APIs or libraries for accessing files, databases, or other data repositories, or through Web servers, FTP servers, or other types of servers providing access to stored data.

Also the example embodiment shown in FIG. 12 may be implemented in a distributed environment that is comprised of multiple, even heterogeneous, computer systems and networks. Different configurations and locations of code and data are also contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible.

Figure 13:
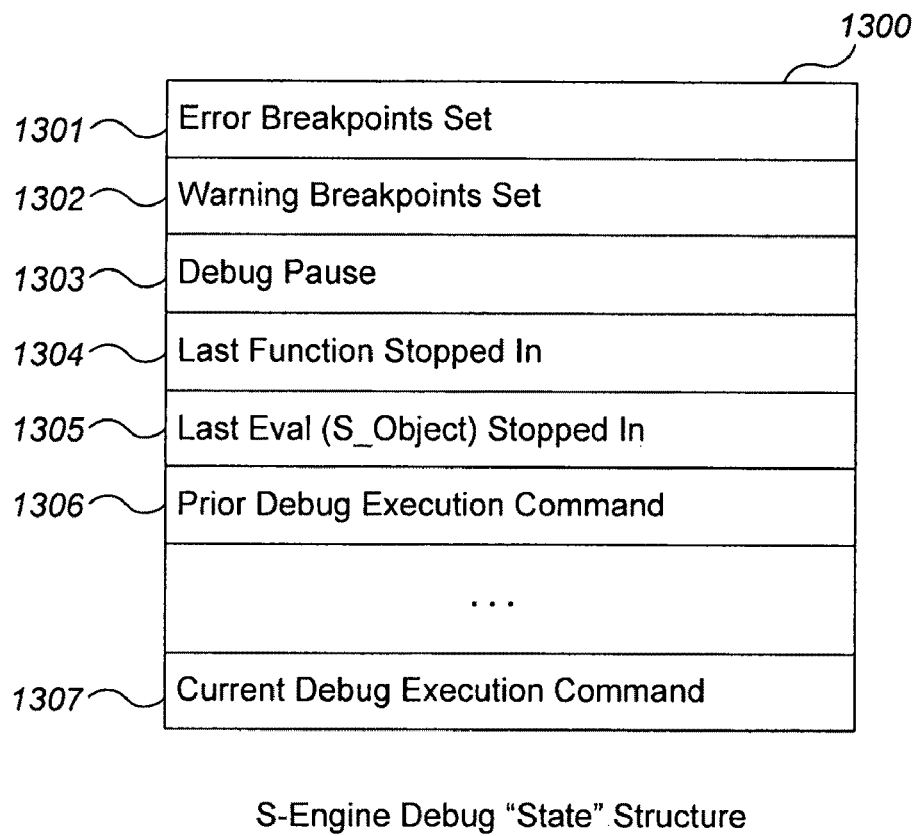
FIG. 13 is an example block diagram of a Debug State data structure for an S-PLUS Engine.

As mentioned, the S-Engine described with reference to FIG. 12 has need to store various state information to efficiently track and respond to requests from the SPWD. FIG. 13 is an example block diagram of a Debug State data structure for an S-PLUS Engine (interpreter). As shown, the state data structure 1300 has a number of fields:
   an Error Breakpoints Set flag 1301, indicating whether the special breakpoint to break on all errors is set;
   a Warning Breakpoints Set flag 1302, indicating whether the special breakpoint to break on all warnings is set;
   a Debug pause indicator 1303;
   an indication 1304 of the last function stopped in;
   an indication 1305 of the last eval stopped in (expression/S-object that was evaluated);
   an indication 1306 of the previous debug command; and
   an indication 1307 of the current (pending) debug command.
Other fields storing other state information can be maintained as needed.

Figure 14:
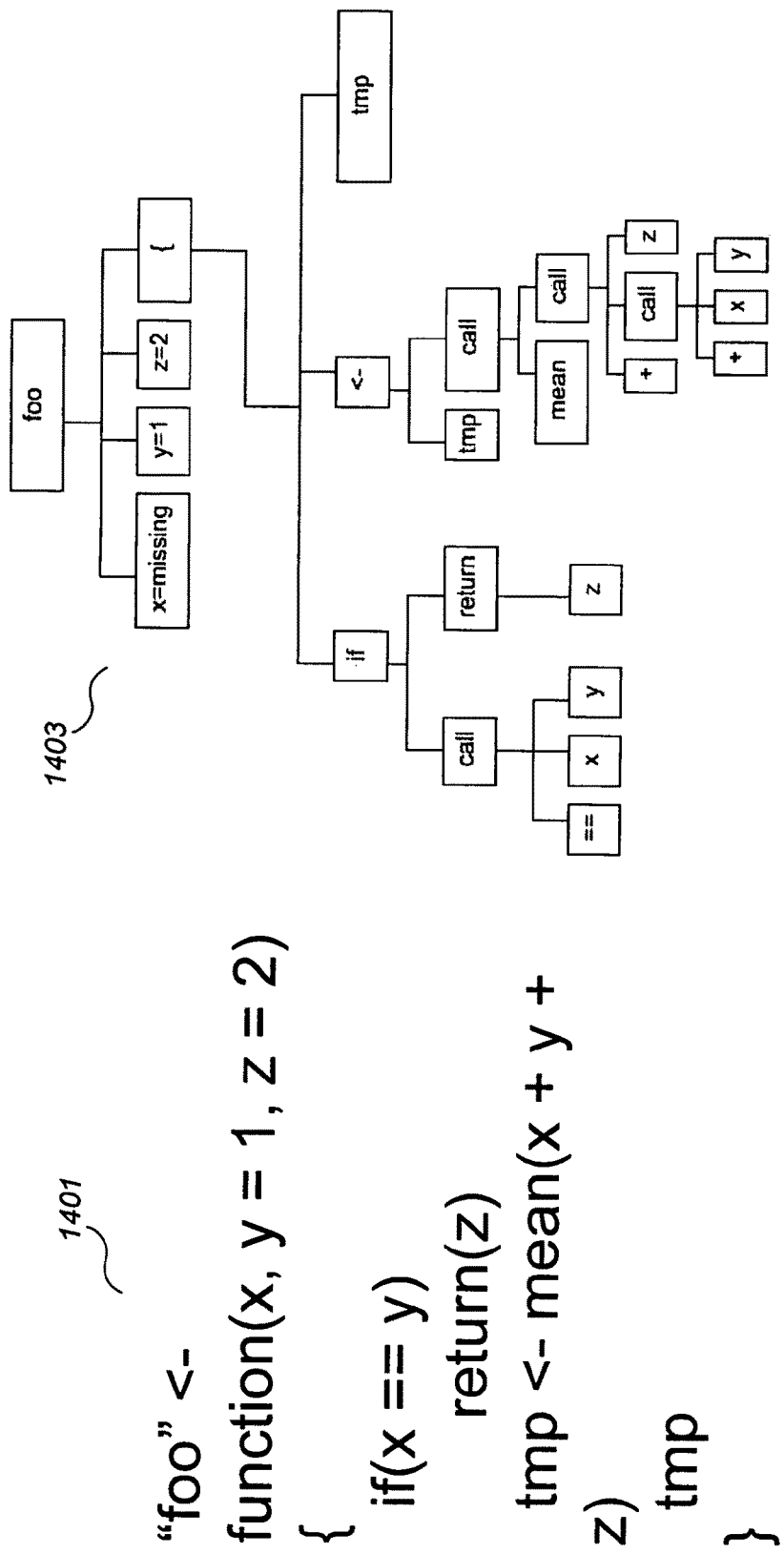
FIG. 14 is an example block diagram of a function and its corresponding parse tree.
Figure 15:
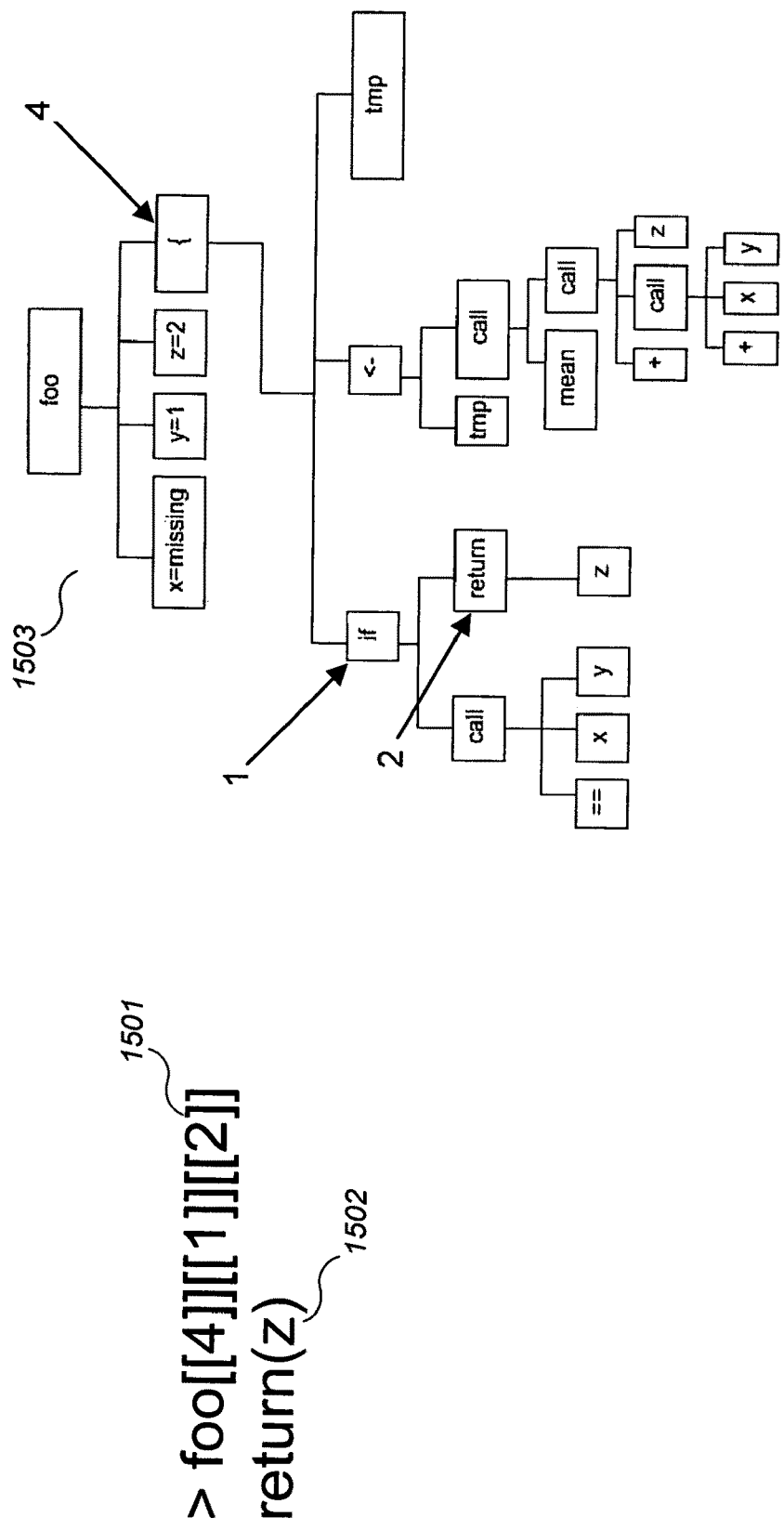
FIG. 15 is an example block diagram showing how the secondary parser generates a logical address to describe an expression in the programmer's source code.
Figure 16:
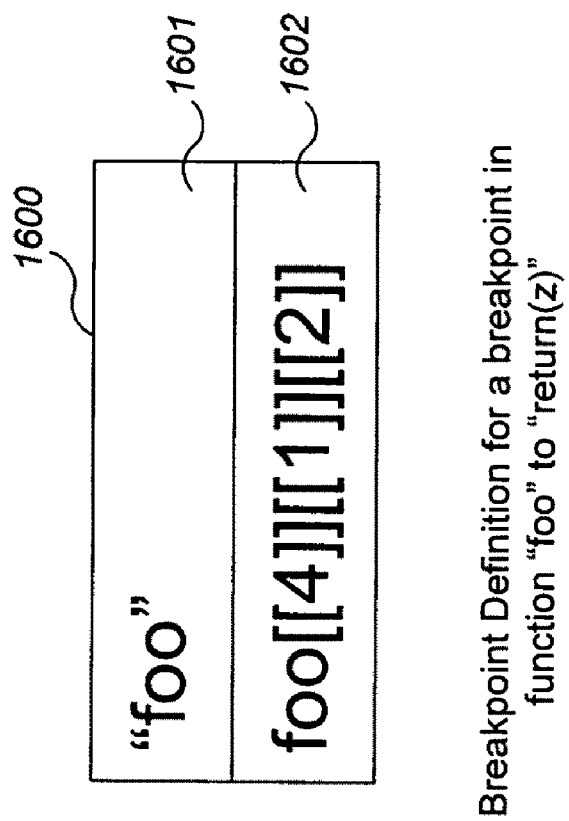
FIG. 16 is an example block diagram of a breakpoint definition structure sent from the S-PLUS Debug Handler to the SPWD Debug Manager.

FIGS. 14-16 illustrate how the SPWD determines a breakpoint address to associate with a cross-reference to the user's source code. The breakpoint address corresponds to a parse tree generated by the secondary (Java-based) parser on the Eclipse Workbench side. This address is translated (mapped, resolved) to a memory address that corresponds to a parse tree node of the primary (C-based) parser in the S-PLUS engine when needed by the S-PLUS evaluator. Note that in overview, breakpoint addresses are mapped with "lazy resolution"—that is, not until needed; however, other protocols such as mapping them immediately may be advantageous in differing scenarios.

FIG. 14 is an example block diagram of a function and its corresponding parse tree. Parse tree 1403 is a "logical" parse tree for function "foo" described by source code 1401 (function definition). Parse trees can be stored using any appropriate data structure. Note that the structure of the logical parse tree 1403 is the same whether or not it is generated via the primary parser in the S-Engine or the Java parser. As used in the embodiments described herein, the Java parser adds information, such as source code line and character numbers (not shown), that is useful for cross-referencing source code in the S-PLUS Workbench environment. This cross-referencing supports features such as "Outline View," which are independent of debugging needs.

FIG. 15 is an example block diagram showing how the secondary parser generates a logical address to describe an expression (S-object) in the programmer's source code. The logical address 1501 "foo[[4]][[1]][[2]]" is shown typed into the Console View in response to the command prompt. The system responds (e.g., using the primary parser) with the expression 1502 "return(z)" showing that the address 1501 corresponds to the expression 1502. The mapping of this logical address is seen in the logical parse tree 1503. The logical address 1501 can be understood in terms of its constituent parts as follows. The logical address "foo[[4]]" indicates the $4^{th}$ element (node) in the parse tree. Arrow 4 corresponds to this $4^{th}$ node, which is the beginning of the function definition for foo (see function definition 1401 in FIG. 14). Similarly, the logical address "foo[[4]][[1]]" corresponds to the $1^{st}$ subchild node of the $4^{th}$ branch of the parse tree. Arrow 1 is shown pointing to this node. The logical address "foo[[4]][[1]][[2]]" corresponds to the $2^{nd}$ subchild node of the $1^{st}$ subchild node (subchild branch) of the $4^{th}$ branch of the parse tree. Thus, using a logical address, the particular node a breakpoint indicates can be determined.

Note that in the SPWD, a breakpoint corresponds to the nearest enclosing expression rather than a line number. In S-PLUS, functions are expressions (which are S-objects), thus functions are handled as expressions. Although the GUI only permits a programmer to indicate a single breakpoint on a line, this is a constraint imposed by the GUI, and, theoretically, any number of breakpoints can be set on a line of source code.

When breakpoints are generated by the programmer, such as by clicking in the left margin in an S-PLUS script editor, or through the menus described earlier, these breakpoints need to be communicated to the S-PLUS Engine. FIG. 16 is an example block diagram of a breakpoint definition structure sent from the S-PLUS Debug Handler (e.g., S-PLUS Debug Handler 1222) to the SPWD Debug Manager (e.g., SPWD Debug Manager 1205). A breakpoint 1600 comprises a function name 1601 and a logical address 1602.

Figure 17:
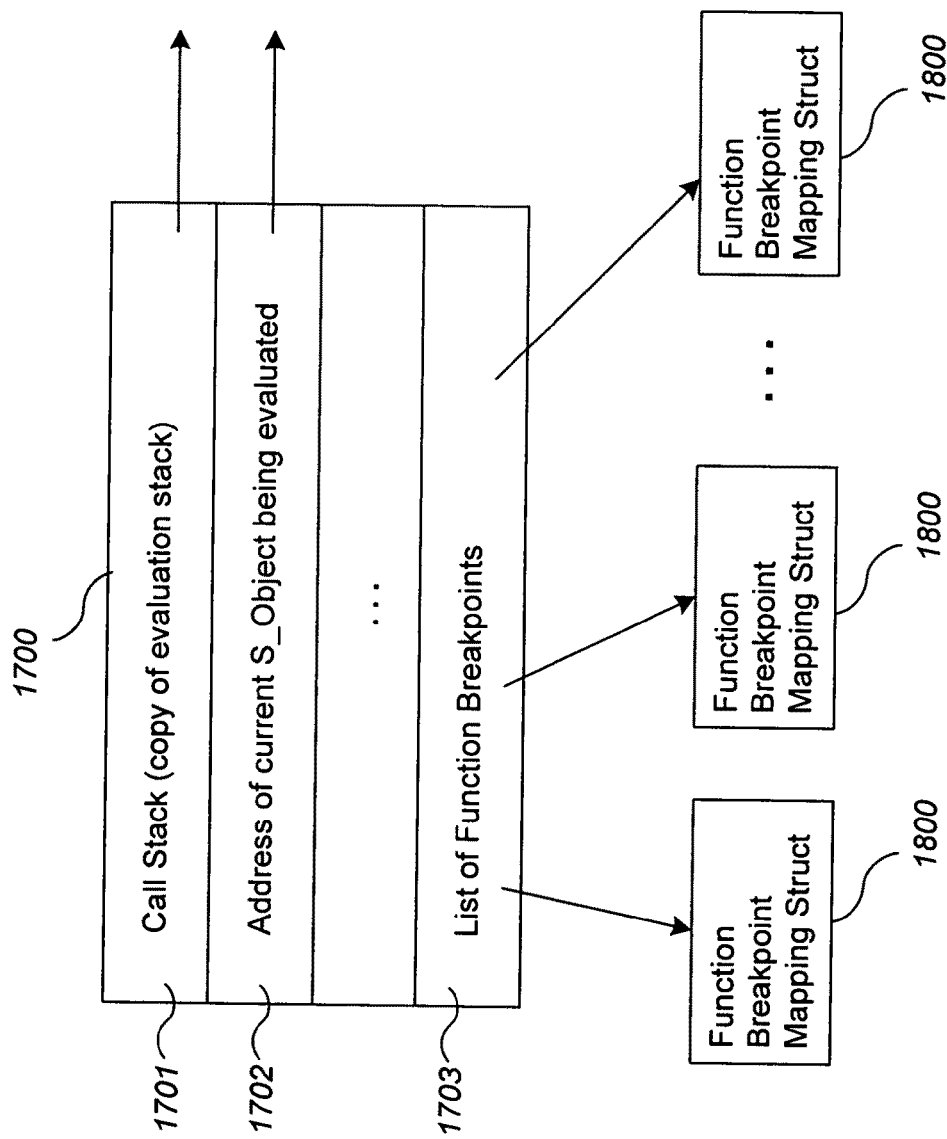
FIG. 17 is an example block diagram of a general data structure used by the S-PLUS Engine to support evaluation.
Figure 18:
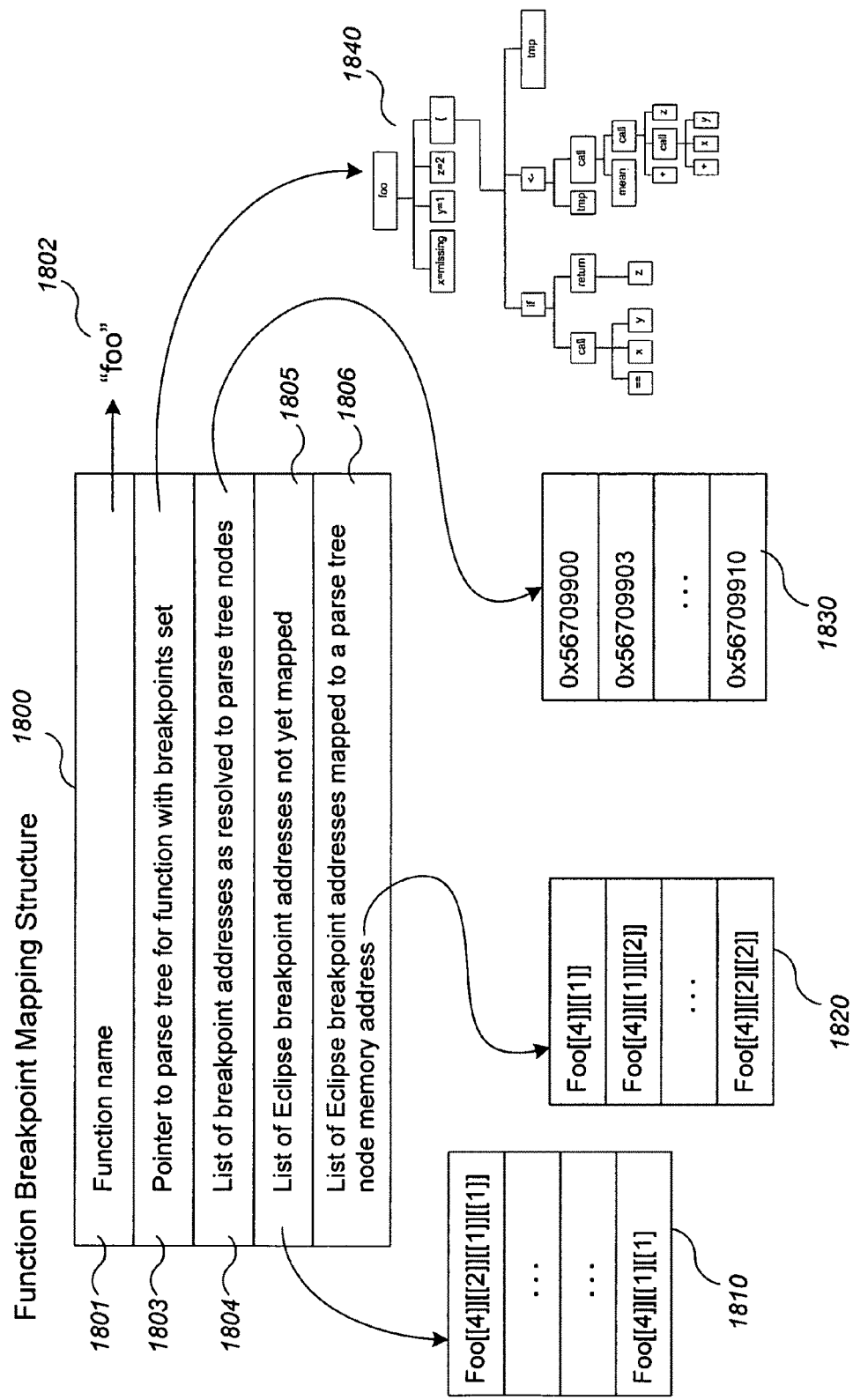
FIG. 18 is an example block diagram of a function breakpoint mapping structure as maintained by the S-PLUS Engine.
Figure 19:
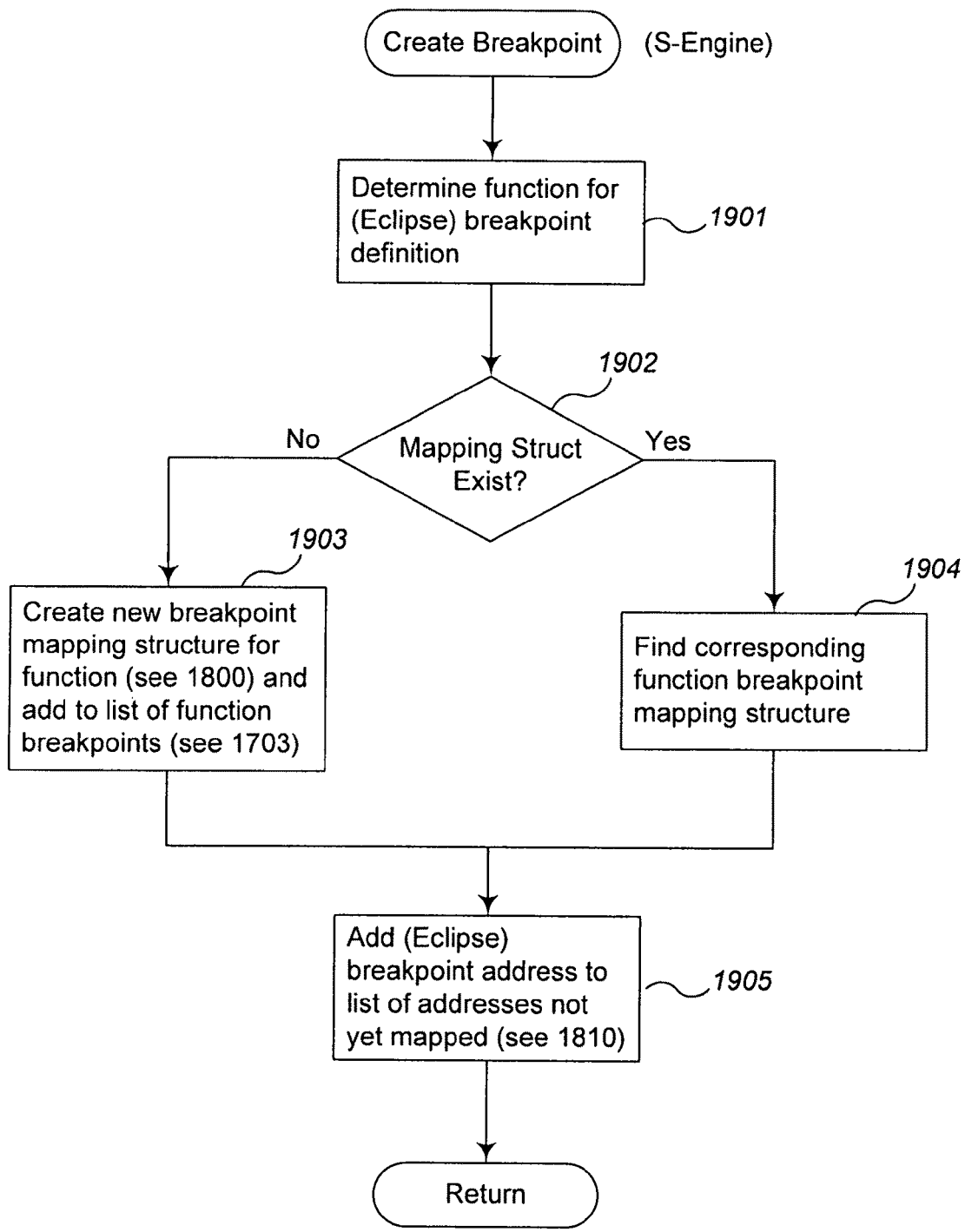
FIG. 19 is an example flow diagram of a routine executed by the S-Engine side components create a breakpoint.

FIGS. 17-19 illustrate the corresponding logical storage structures and techniques used to create and store breakpoint definitions on the S-Engine side. In particular, FIGS. 17 and 18 comprise data structures corresponding to information that the S-PLUS Engine needs to access in order to properly process breakpoints send by the SPWD. FIG. 17 is an example block diagram of a general data structure used by the S-PLUS Engine to support evaluation. As shown, data store 1700 comprises a copy of the call stack 1701 (the evaluation stack), and an indication of the address of the current S-object being evaluated 1702. The copy of the call stack 1701 is used by the debug code to determine where it is. In addition to other data, the data store 1700 includes a list of function breakpoint mapping structures 1703. Each entry on this list is a complete representation of all of the current breakpoints for each function that has breakpoints set. Note that they contain sufficient information to perform "lazy resolution" and thus they may be out of date. Function breakpoint mapping structures are described with reference to FIG. 18.

Figure 20:
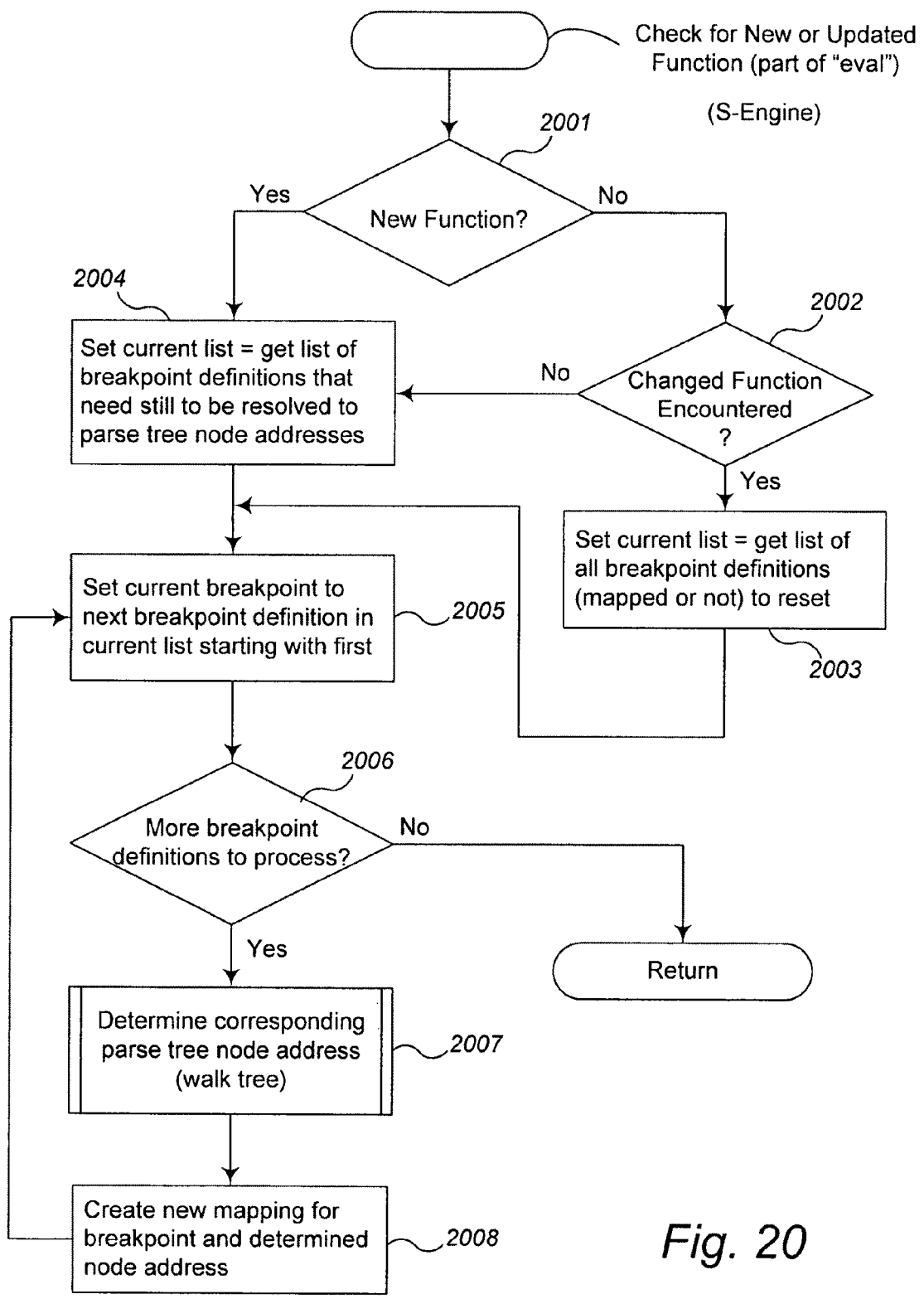
FIG. 20 is an example flow diagram of a code executed as part of an evaluation of an expression.

FIG. 18 is an example block diagram of a function breakpoint mapping structure as maintained by the S-PLUS Engine. The function breakpoint mapping structure 1800 comprises a function name 1801, a reference to the parse tree corresponding to that function 1803, a list of breakpoint addresses 1804 that have been resolved to memory addresses of nodes within the primary parser's parse tree, a, list of (Eclipse Workbench side) logical breakpoint addresses 1805 that have not yet been resolved to memory addresses, and a list of (Eclipse Workbench side) logical breakpoint addresses 1806 that have been resolved (in list 1804)—which functions similar to a reverse directory. The parse tree 1840 indicated by field 1803 is used by the debug functions to compare with the actual parse tree generated by the primary parser to quickly determine whether a function has been modified. (See step 2002 in FIG. 20 described below). The list of breakpoint addresses 1804 points to just that—a list of memory addresses 1830. The list of logical breakpoint addresses 1805 that have not yet resolved points to list 1810. This list 1810 is traversed during an eval( ) of the function named by function name 1801 to update list 1830 (resolved breakpoints). The list 1820 in conjunction with the list 1810 are traversed during an eval( ) of the function named by function name 1801 when the function definition has changed. In that case, all of the breakpoints are re-mapped. FIG. 20 describes this process that occurs during evaluation.

FIG. 19 is an example flow diagram of a routine executed by the S-Engine side components create a breakpoint. For example, this routine may be executed sometime in response to receiving a message indicating one or more breakpoints have been received from the SPWD. As mentioned, the routine performs lazy resolution for efficiency reasons, although modifications could easily be made to resolve a received one or more breakpoints immediately. Specifically, in step 1901, the routine determines from a breakpoint definition data structure (see, for example, FIG. 16) the function that corresponds to a designated breakpoint. In step 1902, the routine determines whether a function breakpoint mapping structure (such as structure 1800) exists for the corresponding function, and, if so, continues in step 1904 to determine the corresponding structure, else continues in step 1903 to create a new function breakpoint mapping structure. Once the appropriate structure is determined/created, then in step 1905, the routine adds the designated breakpoint (logical) address to the list of logical breakpoint addresses that have not yet been mapped (list 1810 pointed to by indicator 1805). The routine then returns. Note that this routine may process a plurality of breakpoint definitions in the same manner by just looping back to step 1901.

FIG. 20 is an example flow diagram of a code executed (at some point) as part of an evaluation of an expression. This code performs the lazy resolution referred to with reference to the prior figures. It is the workhorse for figuring out the how a logical breakpoint address as produced by the SPWD is translated to a corresponding address in the primary S-PLUS parse tree used by the S-PLUS Engine.

More specifically, in step 2001, the code determines whether a new function is being evaluated (whether this is the first time the code has seen this function). If that is the case, it means that the list of breakpoints yet to be resolved contains one or more entries. In the example embodiment, this test is performed by determining whether there is a parse tree pointed to by the function breakpoint mapping structure (see indicator 1803 in FIG. 18). If so, the code continues in step 2004; otherwise, continues in step 2002. In step 2002, the code determines whether the function definition has changed. This test is performed by determining whether the parse tree pointed to by the function breakpoint mapping structure differs from the S-PLUS Engine's parse tree. If so, then the code continues in step 2003 to initialize the list of breakpoint definitions to be processed to indicate all of the breakpoint definitions set for that function—whether or not they have previously been resolved. If not, then the code continues in step 2004. In step 2004, arrived at as a result of processing a new function or a function whose definition has not changed, the code initializes a list of breakpoint definitions to be processed to indicate the breakpoint definitions that have not yet been resolved (see, for example, list 1810 in FIG. 18).

Then, in steps 2005-2008, the code loops over the elements of the list resolving the logical breakpoint definitions to memory addresses of the primary parse tree. Specifically, in step 2005 the code retrieves the next logical breakpoint definition from the list initialized in step 2003 or 2004. In step 2006, if there are more definitions to process, the code continues in step 2007, otherwise returns. In step 2007, the code calls a routine or executes additional substeps to determine the memory address of the parse tree node that corresponds to the logical breakpoint definition. As mentioned the logical address indicates a particular node of the parse tree for the expression being evaluated. Since the parse tree generated by the secondary parser is the same structure as that generated by the primary parser of the S-PLUS engine, the routine can walk the parse tree being evaluated to determine for which node to retrieve an address. Once the memory address is retrieved, then in step 2008, the code creates a new mapping for the breakpoint (for example, in structure 1830), and continues to the beginning of the loop in step 2005.

FIG. 21 is an example of pseudo-code for a modified version of the main evaluation code of the S-PLUS Engine. As can be seen in pseudo-code 2100, a test 2101 and hook 2102 is placed in the main evaluation function "eval( )" to allow a user to "hook in" a routine to debug upon receipt of a breakpoint. A simple test 2101 is provided so as not to adversely affect the efficiency of S-PLUS evaluation when debugging is not being performed. That way, the same eval code can be used whether or not debugging mode is on. When the test 2101 evaluates to true, then hook 2102 is invoked. A description of the routine (code) that implements hook 2102 is described with reference to FIG. 22. Alternatively, if the test 2101 evaluates to false, then the hook 2102 is ignored. A test for function profiling is similarly incorporated, as can be observed from test 2103 and hook 2104.

Figure 22:
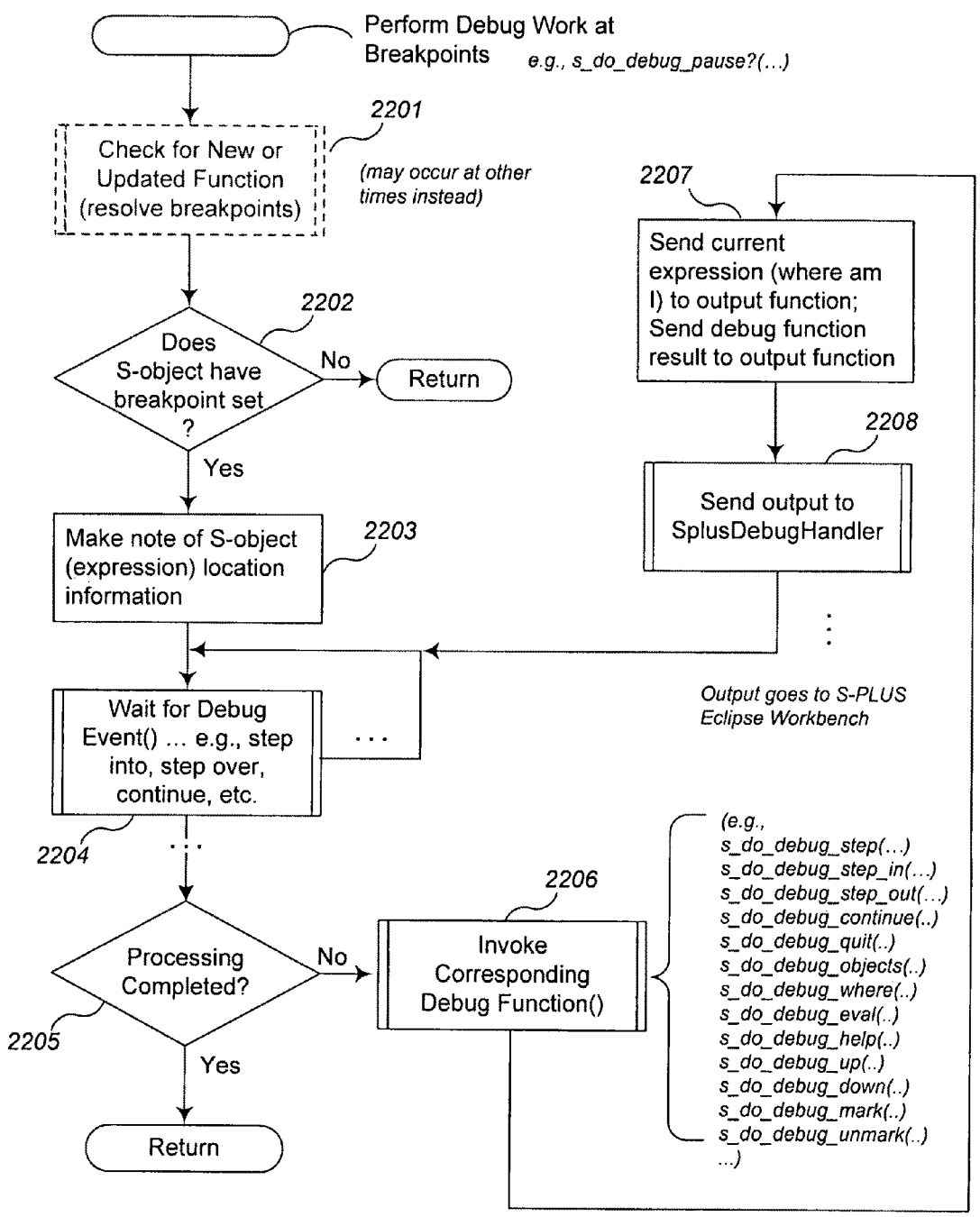
FIG. 22 is an example flow diagram of a routine that is hooked into the main evaluation code of the S-PLUS Engine to support debugging.

FIG. 22 is an example flow diagram of a routine that is hooked into the main evaluation code of the S-PLUS Engine to support debugging. In summary, the routine first checks to see if the object being evaluated (e.g., an S-object) has a breakpoint set, and if so then processes debug events sent by the SPWD once a breakpoint is encountered (evaluation has been paused) and performs the appropriate processing. Debug events can include such commands as "step," "step_in," "step_out," "continue," "where," etc. In an example embodiment of the S-Engine components, invoked synchronously, a debug event queue is maintained on the S-Engine side to enable the S-PLUS Engine to continue processing. The events are accumulated on a queue which is processed by the routine of FIG. 22.

More specifically, in step 2201, the routine calls the routine that updates the breakpoints, resolving logical addresses as needed. This routine was described with reference to FIG. 20, and may be invoked as shown here, or elsewhere, or both. In step 2202, the function determines whether the expression currently being evaluated has a breakpoint set and, if not returns, otherwise continues in step 2203. In step 2203, the routine notes any needed expression location information to process the breakpoint and continues in step 2204. In step 2204, the routine cycles waiting for a next debug event on the queue to process, or notification that the queue processing should be done (for now). The evaluation of the current expression is "paused" until a debug command is processed. According to one embodiment, when one of the debugging functions determines that debugging under the current expression evaluation is or should be completed, then that function sets a flag accordingly (for example by setting a specific value in the current debug execution command field 1307 in the S-Engine Debug state structure). Then in step 2205, the routine checks if this flag is set, and, if so, returns which will complete the current invocation of the "eval( )" function, else, if not, continues in step 2206. In step 2206, the routine invokes the corresponding debug function, which performs whatever processing is indicated and generates results appropriately. As mentioned, one of the activities that may be performed is to indicate that processing in the current evaluation frame is completed. When the debug function processing is completed, the routine continues in step 2207. In step 2207, the routine sends an indication of the current expression being evaluated and any result returned from the debug function and forwards them in step 2208 to the S-PLUS Debug Handler. The routine then returns to wait for the next event in step 2204 (which terminates as indicated above).

FIG. 23 is an example of pseudo-code for a modified version of the memory allocation routines of the S-PLUS Engine. One will recall that in the example embodiment described, memory allocations to particular data structures are reported to the SPWD to be tracked and accumulated for presentation in the Allocations View. As can be seen in pseudo-code, there are two routines that allocate memory used for data structures, the alvec( . . . ) routine 2301 and the S_ok_malloc( . . . ) routine 2302. Both routines include a test for profiling being turned on, followed by invocation of a hook, hooks 2303 and 2304, respectively.

Note that although example detail is provided for how debug events are handled and processed when evaluation is paused, the other debug messages, notifications, and requests for debug information are handled in an analogous manner by the components of the S-Engine side. Also, the profiling functions are handled in an analogous manner by the S-PLUS Profile Handler (e.g., S-PLUS Profile Handler 1223) in conjunction with the profiler functions in component 1233.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/789,623, entitled "METHOD AND SYSTEM FOR PROVIDING A VISUAL DEBUGGER FOR A STATISTICAL LANGUAGE," filed Apr. 4, 2006, is incorporated herein by reference, in its entirety.

From the foregoing it will be appreciated that, although specific embodiments have been described herein for purposes of illustration, various modifications may be made without deviating from the spirit and scope of the invention. For example, the methods and systems for performing visual debugging of an interpreted language discussed herein are applicable to other architectures other than a web-based architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for debugging interpreted code in a visual debugger using breakpoints to facilitate step-based evaluation of expressions, comprising:
   presenting a visual user interface for receiving debugging commands;
   in response to a received debug command to set or change an indicated breakpoint in a segment of code that is expressed in an interpreted programming language and that defines one or more expressions,
   determining the nearest enclosing expression to the indicated breakpoint, including when the nearest enclosing expression begins on a line of source code associated with the code segment that is different from a line of the associated source code that contains the indicated breakpoint; and
   generating a breakpoint address that indicates a location in the segment of code that corresponds to the beginning of the determined enclosing expression when the code segment is evaluated by:
   generating a logical breakpoint address that indicates the beginning of the determined enclosing expression; and
   mapping the generated logical breakpoint address to a memory address that corresponds to an element in a parse tree generated for evaluating the determined enclosing expression, the element corresponding to the beginning of the determined enclosing expression; and
   causing the code segment to be evaluated using an interpreter for the interpreted programming language, such that evaluation automatically stops when the location in the code segment that corresponds to the breakpoint address is encountered; and
   causing one or more source code statements that correspond to and indicate the location in the code segment where the evaluation stopped to be displayed in the visual interface; and
   receiving one or more additional debug commands to further control the evaluation of the code segment or to examine aspects of the code segment under evaluation.

2. The method of claim 1 wherein the received debug command to set or change the indicated breakpoint is indicated by selection of a portion of a line in source code associated with the code segment and wherein the determining the nearest enclosing expression to the indicated breakpoint determines an expression that begins on a line that is different from the line associated with the selected portion.

3. The method of claim 2, further comprising receiving a second debug command that sets a second indicated breakpoint on the same line in the source code associated with the code segment, such that a plurality of breakpoints are concurrently active for the code segment.

4. The method of claim 1, the code segment associated with a current file that contains the expressions that define the code segment, wherein the nearest enclosing expression to the indicated breakpoint refers to a function that is defined outside of the current file.

5. The method of claim 1 wherein the visual user interface is an Interactive Development Environment ("IDE") having a predefined set of interfaces for developing and testing program code.

6. The method of claim 5 wherein the IDE uses Eclipse code, and the visual user interface is implemented as a debug perspective plug-in.

7. The method of claim 5 wherein no launch configuration information is required to be forwarded to the IDE prior to debugging the code.

8. The method of claim 1 wherein the interpreted programming language is S-PLUS.

9. The method of claim 1 wherein the interpreted programming language is a language used to generate statistical programs.

10. The method of claim 1 wherein the one or more additional debug commands include one or more of commands for stepping execution, marking or unmarking breakpoints, or continuing execution.

11. The method of claim 1 wherein the one or more additional debug commands include one or more of commands for examining an associated value of an object, an expression, or a variable.

12. The method of claim 1 wherein the breakpoint address is generated without using pre-computed symbolic information associated with the code segment.

13. A non-transitory computer-readable medium whose contents enable a computing system to provide for debugging of interpreted code in a visual debugger using breakpoints that facilitate step-based evaluation of expressions, by performing a method comprising:
   presenting a user interface for receiving debugging commands;
   in response to a received debug command to set or change an indicated breakpoint in a segment of code that is expressed in an interpreted programming language and that defines one or more expressions,
   determining the nearest enclosing expression to the indicated breakpoint, including when the nearest enclosing expression begins on a line of source code associated with the code segment that is different from a line of the associated source code that contains the indicated breakpoint; and
   generating a breakpoint address that indicates a location in the segment of code that corresponds to the beginning of the determined enclosing expression when the code segment is evaluated by:
   generating a logical breakpoint address that indicates the beginning of the determined enclosing expression; and
   mapping the generated logical breakpoint address to a memory address that corresponds to an element in a parse tree generated for evaluating the determined enclosing expression, the element corresponding to the beginning of the determined enclosing expression; and
   causing the code segment to be evaluated using an interpreter for the interpreted programming language, such that evaluation automatically stops when the location in the code segment that corresponds to the breakpoint address is encountered; and
   causing one or more source code statements that correspond to and indicate the location in the code segment where the evaluation stopped to be displayed in the visual interface.

14. The computer-readable medium of claim 13, the method further comprising:
   receiving one or more additional debug commands to further control the evaluation of the code segment or to examine values of variables or expressions contained in the code segment.

15. The computer-readable medium of claim 13 wherein the visual interface is an Interactive Development Environment ("IDE").

16. The computer-readable medium of claim 13 wherein the computer-readable medium is a memory in a computing device.

17. The computer-readable medium of claim 13 wherein the contents are instructions that, when executed, cause the computing system to perform the method.

18. The computer-readable medium of claim 13 wherein the instructions that perform the causing of the code segment to be evaluated using the interpreter for the interpreted programming language, such that evaluation automatically stops when the location in the code segment that corresponds to the breakpoint address is encountered are implemented as hooks in an existing interpreter.

19. A computing system for debugging code programmed in an interpreted language defining a plurality of expressions, comprising:
   a memory;
   a computer processor;
   a parser stored in the memory and configured, when executed by the computer processor, to create a parse tree for an indicated function;
   a debug command module stored in the memory and configured, when executed by the computer processor, to receive debugging commands from a user via a visual user interface and, when a command is received to set or change a breakpoint in the indicated function, generating a logical breakpoint address that indicates an expression contained within the function;
   a debug handler stored in the memory and configured, when executed by the computer processor, to receive the generated logical breakpoint address, resolve the logical breakpoint address into a memory address that corresponds to a location in the parse tree created for the function, record information to associate the breakpoint with the function; and
   an evaluation module for the interpreted language, stored in the memory, and configured, when executed by the computer processor, to receive an expression in the interpreted language that contains a call to the function, and traverse a parse tree corresponding to the received expression to generate output defined by evaluating the expression such that, when the location that corresponds to the breakpoint associated with the function is encountered in the parse tree created for the function, the evaluation module pauses to receive debug commands to further control evaluation of the expression or to examine values of objects associated with the expression.

20. The computing system of claim 19 wherein the interpreted language is S-PLUS.

21. The computing system of claim 19 wherein the parser is a preexisting parser unmodified to support debugging operations.

22. The computing system of claim 19 wherein the evaluation module is modified to examine each node in a parse tree when the node is traversed to determine whether a breakpoint has been set.

23. The computing system of claim 19 wherein the debug command module and debug handler are executed in separate processes.

24. The computing system of claim 19 wherein the debug command module and debug handler are hosted on separate machines.

25. The computing system of claim 19 wherein the debug commands to further control evaluation of the expression include one or more of commands for stepping execution, marking or unmarking breakpoints, or continuing execution.

26. The computing system of claim 19 wherein the debug commands to examine values of objects associated with the expression include one or more of commands for examining an associated value of an object, an expression, or a variable.

27. A method in a computing system for debugging code for an interpreted language, comprising:
presenting a user interface for receiving debugging commands;
in response to a received debug command from the user interface to set or change a breakpoint in an indicated function, generating a logical breakpoint address that logically indicates the beginning of a determined enclosing expression within the indicated function;
mapping the logical breakpoint address into a memory address that corresponds to a location in a parse tree produced by a parser that is unmodified to handle debugging, the location corresponding to the beginning of evaluation of the determined enclosing expression; and
under control of a debug handler of a language interpreter, evaluating the indicated function according to the produced parse tree; and halting evaluation when the location in the parse tree that corresponds to the breakpoint is encountered, such that debug commands can be processed to further control evaluation of the expression or to examine values of objects associated with the expression.

28. The method of claim 27 wherein the interpreted language is a language used to generate statistical programs.

29. The method of claim 27 wherein the interpreted language is S-PLUS.

30. The method of claim 27 wherein the interface is part of an Interactive Development Environment ("IDE").

31. The method of claim 30 wherein the IDE is Eclipse.

32. The method of claim 27 wherein the interface is a command line debugger.

33. The method of claim 27, further comprising using a secondary parser to generate the logical breakpoint address.

34. The method of claim 33 wherein the secondary parser is a Java-based parser.

35. The method of claim 33 wherein the parser is a C-based parser.

36. The method of claim 27, further comprising executing additional debug commands when a breakpoint is encountered while evaluating the code.

37. The method of claim 36 wherein the additional debug commands are executed using a hook in an evaluation function of the language interpreter.

38. A non-transitory computer-readable medium whose contents enable a computing system to perform debugging of code written in an interpreted language, by performing a method comprising:
presenting a user interface for receiving debugging commands;
in response to a received debug command from the user interface to set or change a breakpoint in the an indicated function, generating a logical breakpoint address that logically indicates the beginning of a determined enclosing expression;
mapping the logical breakpoint address into a memory address that corresponds to a location in a parse tree produced by a parser that is unmodified to handle debugging, the location corresponding to the beginning of evaluation of the determined enclosing expression; and
under control of an evaluation module of a debug handler for interpreting the language, evaluating the indicated function according to the produced parse tree; and halting execution when the location in the parse tree that corresponds to the breakpoint is encountered, such that debug commands can be processed to further control evaluation of the expression or to examine values of objects associated with the expression.

39. The computer-readable medium of claim 38 wherein the computer-readable medium is a memory in a computing device.

40. The computer-readable medium of claim 38 wherein the contents are instructions that, when executed, cause the computing system to perform the method.

* * * * *